United States Patent
Gibson

(10) Patent No.: US 9,616,907 B1
(45) Date of Patent: Apr. 11, 2017

(54) MULTI-MODE HAND TRUCK

(71) Applicant: Ameriwood Industries, Inc., Wright City, MO (US)

(72) Inventor: William R Gibson, Kent, OH (US)

(73) Assignee: Dorel Home Furnishings, Inc., Wright City, MO (US)

( * ) Notice: Subject to any disclaimer, the term of this patent is extended or adjusted under 35 U.S.C. 154(b) by 0 days.

(21) Appl. No.: 14/875,785

(22) Filed: Oct. 6, 2015

(51) Int. Cl.
*B62B 1/10* (2006.01)
*B62B 1/12* (2006.01)

(52) U.S. Cl.
CPC ...................... *B62B 1/12* (2013.01)

(58) Field of Classification Search
None
See application file for complete search history.

(56) References Cited

U.S. PATENT DOCUMENTS

| | | | |
|---|---|---|---|
| 2,363,619 A | 11/1942 | Prieto | |
| 2,598,168 A | 5/1952 | Hooz et al. | |
| 2,786,692 A | 3/1957 | Timpson | |
| 3,785,669 A | 1/1974 | Doheny | |
| 3,873,118 A | 3/1975 | Takagi | |
| 4,227,709 A | 10/1980 | Gradwohl et al. | |
| 4,358,124 A | 11/1982 | Geschwender | |
| 4,401,319 A * | 8/1983 | Kazmark | B62B 1/125 280/655 |
| 4,561,674 A | 12/1985 | Alessio | |
| 4,659,096 A | 4/1987 | Leimgruber | |
| 4,681,330 A | 7/1987 | Misawa | |
| 4,921,270 A | 5/1990 | Schoberg | |
| 5,207,439 A | 5/1993 | Mortenson | |
| 5,476,282 A | 12/1995 | Dahl | |
| 5,536,034 A | 7/1996 | Miller | |
| 5,709,400 A | 1/1998 | Bonnier et al. | |
| 5,779,251 A | 7/1998 | Meier | |
| 5,810,373 A | 9/1998 | Miranda | |
| 6,053,514 A | 4/2000 | Su | |
| 6,053,515 A | 4/2000 | Kelley | |
| 6,273,438 B1 | 8/2001 | Prapavat | |
| 6,308,967 B1 | 10/2001 | Stallbaumer et al. | |
| 6,328,319 B1 | 12/2001 | Stahler, Sr. | |
| 6,364,328 B1 | 4/2002 | Stahler, Sr. | |
| 6,419,244 B2 | 7/2002 | Meabon | |
| 6,880,835 B2 | 4/2005 | Tornabene et al. | |
| 6,945,545 B2 | 9/2005 | Celli | |
| 7,168,712 B2 | 1/2007 | Celli | |

(Continued)

FOREIGN PATENT DOCUMENTS

DE    6751061 U    1/1969

OTHER PUBLICATIONS

International Search Report and Written Opinion, International Application No. PCT/US/2014/046490, Nov. 6, 2014, 8 pages.

*Primary Examiner* — Erez Gurari
(74) *Attorney, Agent, or Firm* — Barnes & Thornburg LLP

(57) ABSTRACT

A hand truck is convertible to assume an expanded use mode and a flat storage mode. The hand truck includes a rolling base and a base pusher. The rolling base is arranged to support goods and to roll on ground underlying the hand truck. The base pusher is mounted on the rolling base for pivotable movement about a base-pusher pivot axis from an upright hand-truck position to a storage position to rearrange the hand truck between the expanded use mode and the flat storage mode.

28 Claims, 14 Drawing Sheets

(56) References Cited

U.S. PATENT DOCUMENTS

| | | |
|---|---|---|
| 7,600,765 B2 | 10/2009 | Tsai |
| 7,784,816 B2 | 8/2010 | Jian et al. |
| 7,819,409 B2 | 10/2010 | Chang |
| 8,091,916 B2 | 1/2012 | Shapiro |
| 8,100,430 B2 | 1/2012 | Meyers et al. |
| 8,465,046 B2 | 6/2013 | Meyers et al. |
| 9,096,249 B2 | 8/2015 | Gibson |
| 2003/0075887 A1 | 4/2003 | Malone, Jr. |
| 2004/0256818 A1 | 12/2004 | Amsili |

* cited by examiner

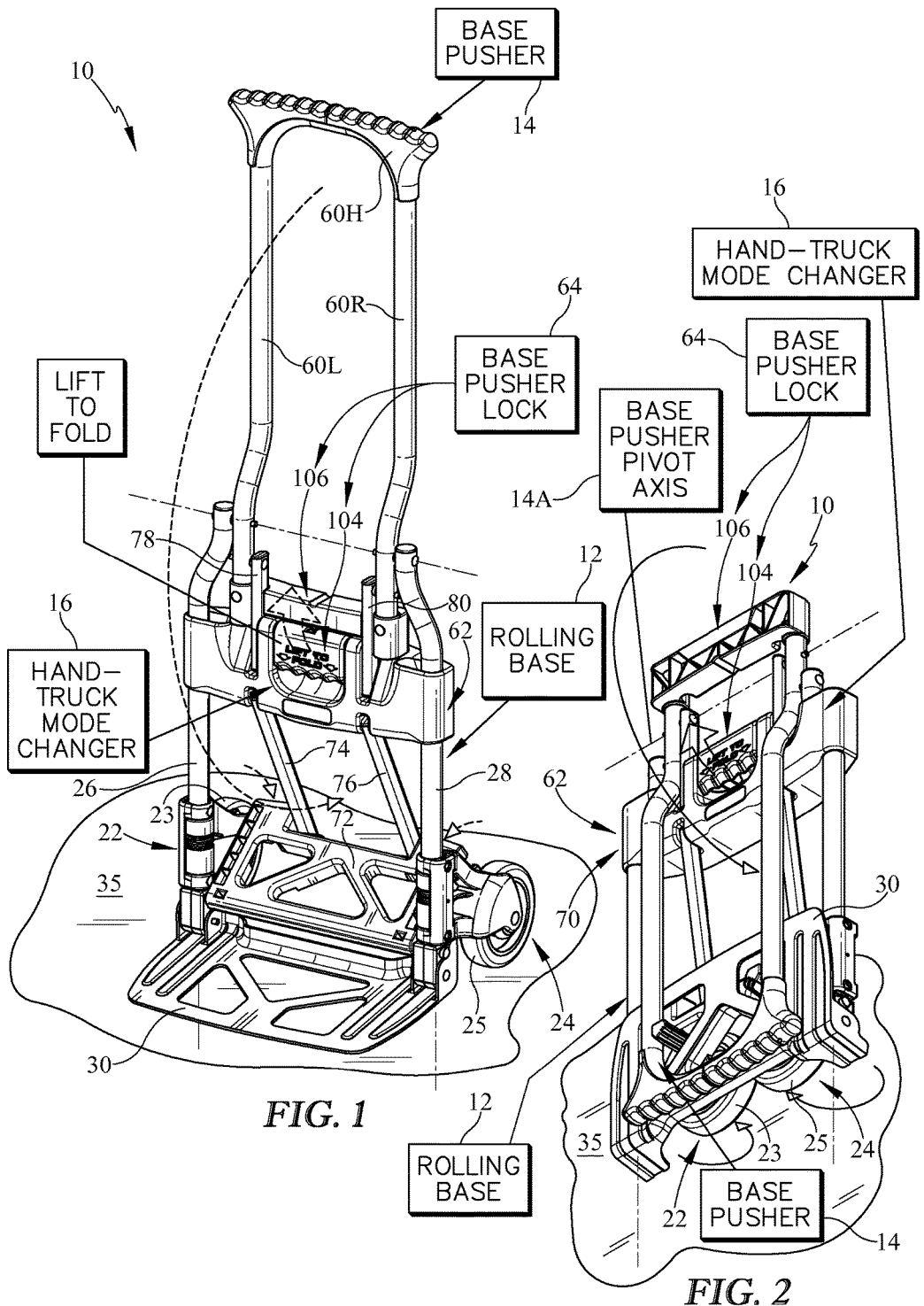

MULTI-MODE HAND TRUCK

BACKGROUND

The present disclosure relates to a hand truck and particularly to a hand truck that can be collapsed to assume a compact storage mode. More particularly, the present disclosure relates to a hand truck that can be reconfigured between the compact storage mode and an expanded use mode in the field by a user.

SUMMARY

According to the present disclosure, a collapsible hand truck is movable from an expanded use mode to a flat storage mode. The collapsible hand truck includes a rolling base and a base pusher mounted on the rolling base for movement relative to the rolling base. When the hand truck is in the expanded use mode, the base pusher is in an upright hand-truck position and extends away from the rolling base. When the hand truck is in the flat storage mode, the base pusher is in a storage position and extends along the rolling base.

In illustrative embodiments, the collapsible hand truck includes a hand-truck mode changer coupled to the rolling base and the base pusher. The hand-truck mode changer provides means for holding the base pusher in the upright hand-truck position relative to the load-support frame to maintain the hand truck in the expanded use mode until a user lifts up on a base-pusher rotation blocker with one hand to release the base pusher for movement to the storage position so that the hand truck may be reconfigured to the flat storage mode.

In illustrative embodiments, the hand-truck mode changer includes a base-pusher lock. The base-pusher lock includes a pusher latch and the base-pusher rotation blocker. The pusher latch is coupled to the base pusher for movement with the base pusher about a base-pusher pivot axis between the upright hand-truck position and the storage position. The base-pusher rotation blocker is coupled to the rolling base to pivot relative to the rolling base. The base-pusher rotation blocker engages the pusher latch to block movement of the pusher latch relative to the rolling base to lock the base pusher in the upright hand-truck position to maintain the hand truck in the expanded use mode until a user lifts upwardly on the base-pusher rotation blocker so that the base-pusher rotation blocker pivots relative to the rolling base and frees the pusher latch for movement relative to the rolling base allowing the base pusher to move to the storage position so that the hand truck may be reconfigured to the flat storage mode.

In illustrative embodiments, the hand-truck mode changer includes a wheel-spreader system. The wheel-spreader system is configured to pivot left and right wheel units included in the rolling base relative to companion wheel-support rails of the rolling base from an unfolded rolling position to a folded storage position when the base pusher moves from the upright hand-truck position to the storage position. The base-pusher rotation blocker of the base-pusher lock is coupled to the wheel-spreader system.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a collapsible hand truck in an expanded use mode in which a base pusher of the hand truck extends away from a rolling base and wheel units included in the rolling base are pivoted outwardly to an unfolded rolling positions to allow the hand truck to roll on its two wheels and suggesting that the hand truck includes a hand-truck mode changer having a base-pusher lock configured to hold the base pusher in the upright hand-truck position and the hand truck in the expanded use mode;

FIG. 2 is a perspective view of the hand truck of FIG. 1 after a user has unlocked the base pusher lock by lifting upwardly on a base-pusher rotation blocker to allow reconfiguration of the hand truck in the field to assume a compact flat storage mode by pivoting the base pusher about a base-pusher pivot axis downwardly toward the rolling base through an angle of about 180 degrees to assume a storage position extending along the rolling base, movement of the base pusher to the storage position causes upwardly sliding movement of the hand-truck mode changer on two rails included in a load-support frame of the rolling base and causes each of the wheel units to pivot inwardly from the unfolded rolling position shown in FIG. 1 to the folded storage positions shown in FIG. 2 in which the two wheels included in the rolling base lie in folded storage positions under the U-shaped handgrip of the base pusher;

FIG. 11 is a side elevation view the hand truck in the expanded use mode in which both wheels are arranged to roll along the ground underlying the hand truck and showing the base pusher locked in the upright hand-truck position by the base-pusher lock and the left and right wheel units in their unfolded rolling positions;

FIG. 12 is a perspective view of the hand truck of FIG. 11 in the expanded use mode;

FIG. 13 is a side elevation view of the collapsible hand truck in a transition mode showing the base pusher is being rotated about the base-pusher pivot axis from the upright hand-truck position toward the storage position to cause the left and right wheel units to pivot and reach a midway point between the unfolded rolling positions shown in FIG. 11 and the folded storage positions shown in FIG. 15;

FIG. 14 is a perspective view of the hand truck of FIG. 13 in the transition mode;

FIG. 15 is a side elevation view of the collapsible hand truck in the flat storage mode showing the base pusher in the storage position on top of a load-support frame of the rolling base and the left and right wheel units in their folded storage positions under the U-shaped handgrip included in the base pusher;

FIG. 16 is a perspective view of the hand truck of FIG. 15 in the flat storage mode;

DETAILED DESCRIPTION

Figure 3:
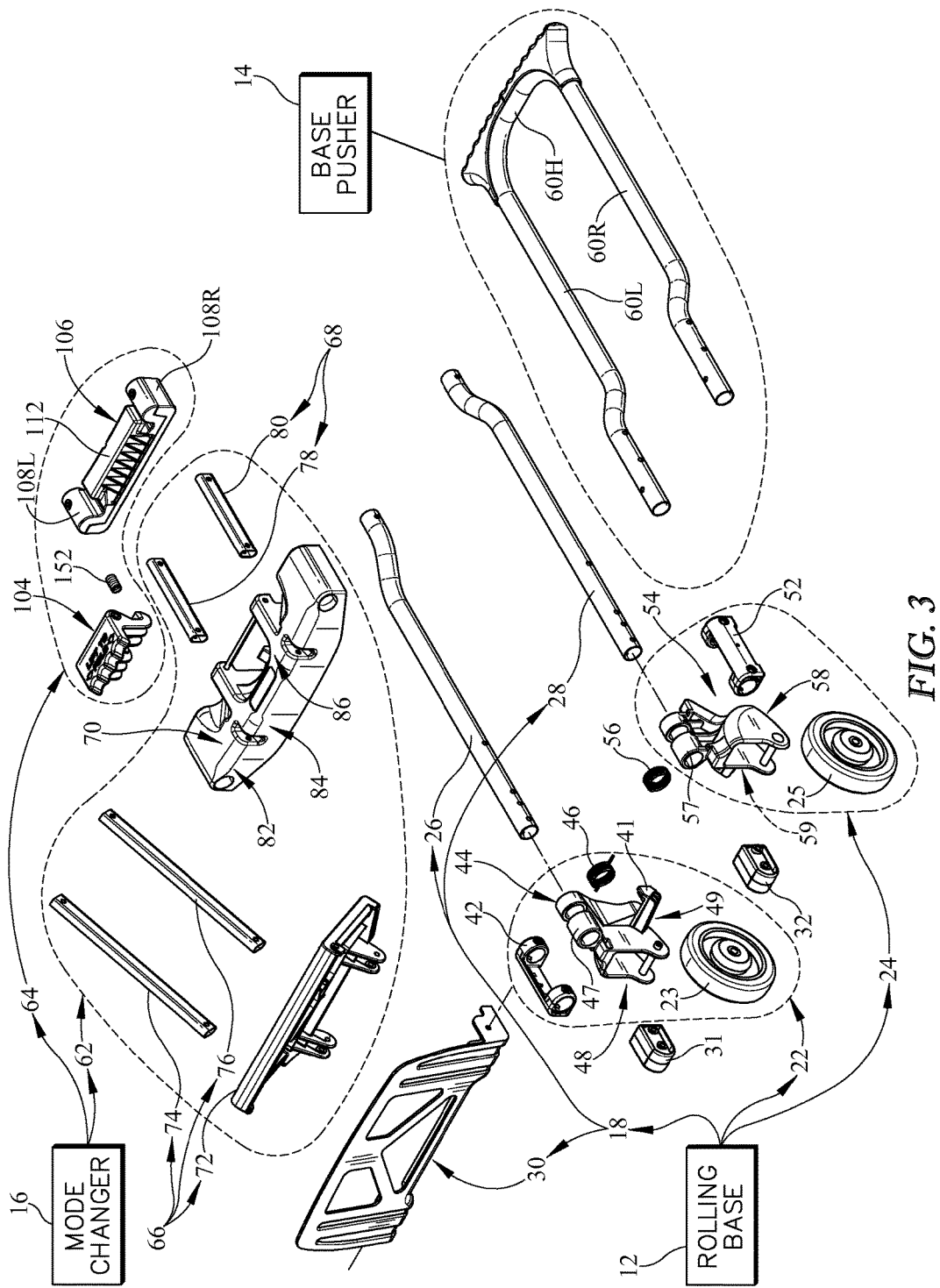
FIG. 3 is an exploded perspective view of components comprising the collapsible hand truck of FIGS. 1 and 2.

A hand truck 10 in accordance with the present disclosure includes a rolling base 12, a pivotable base pusher 14, and a hand-truck mode changer 16 as shown in FIGS. 1-16. Hand-truck mode changer 16 can be operated in the field without tools by a user in a manner suggested illustratively in FIGS. 11-16 to convert hand truck 10 from an expanded use mode shown in FIGS. 1 and 12 to a flat storage mode shown in FIGS. 2 and 16. Another embodiment of a hand truck 1010 in accordance with the present disclosure is shown in FIGS. 17-23. Hand-truck 1010 can be operated in the field without tools by a user in a manner suggested illustratively in FIGS. 20-23 to convert hand truck 1010 from an expanded use mode shown in FIG. 17 to a flat storage mode shown in FIG. 18.

Hand truck 10, shown in FIGS. 1-16 includes rolling base 12, pivotable base pusher 14, and hand-truck mode changer 16. Rolling base 12 includes a load-support frame 18 configured to support goods, a left wheel unit 22 including a left wheel 23, and a right wheel unit 24 including a right wheel 25 as shown, for example, in FIGS. 1 and 3. Base pusher 14 is mounted on load-support frame 18 of rolling base 12 for pivotable movement about a base-pusher pivot axis 14A in a first direction from an upright hand-truck position in which left and right wheel units 22, 24 are arranged to roll on ground 35 underlying hand truck 10 to establish the expanded use mode of hand truck 10 as shown in FIG. 1 through about a 180 degree angle toward load-support frame 18 to reach a storage position arranged to lie on top of rolling base 12 in the flat storage mode of hand truck 10, shown in FIG. 2.

Hand-truck mode changer 16 provides means for holding base pusher 14 in the upright hand-truck position relative to load-support frame 18 to maintain selectively hand truck 10 in the expanded use mode as shown in FIG. 1. Hand-truck mode changer 16 may be operated by a user to free base pusher 14 and allow the user to move base pusher 14 relative to rolling base 12 from the upright hand-truck position to the storage position to move hand truck 10 from the expanded use mode, shown in FIG. 1, to the collapsed flat storage mode shown in FIG. 2. Hand-truck mode changer 16 provides means for pivoting wheels 23, 25 included in wheel units 22, 24 from an unfolded rolling position, shown in FIG. 1, to a folded storage position in response to movement of base pusher 14 from the upright hand-truck position to the storage position as shown in FIG. 2.

Rolling base 12 includes load-support frame 18, left wheel unit 22 including left wheel 23, and right wheel unit 24 including right wheel 25 as shown, for example, in FIGS. 1-4. Load-support frame 18 includes a left wheel-support rail 26, a right wheel-support rail 28, and a toe-plate shelf 30 mounted on lower ends of wheel-support rails 26, 28. Left wheel unit 22 is pivotable about a left pivot axis 26A aligned with left wheel-support rail 26 as suggested in FIG. 3. Right wheel unit 24 is pivotable about a right pivot axis 28A aligned with right wheel-support rail 28 as suggested in FIG. 3.

Base pusher 14 includes a left leg 60L, a right leg 60R, and a U-shaped handgrip 60H interconnecting upper ends of legs 60L, 60R as shown in FIG. 3. Left and right legs 60L, 60R of base pusher 14 are mounted on left and right wheel-support rails 26, 28 of rolling base 12 for pivotable movement about base-pusher pivot axis 14A in a first direction from the upright hand-truck position in which wheels 23, 25 in left and right wheel units 22, 24 roll on ground 35 underlying hand truck 10 and establish the expanded use mode of hand truck 10 through about a 180 degree angle toward left and right wheel-support rails 26, 28 to lie alongside left and right wheel-support rails 26, 28 on top of rolling base 12 in the flat storage mode of hand truck 10 shown in FIG. 2.

Figure 5:
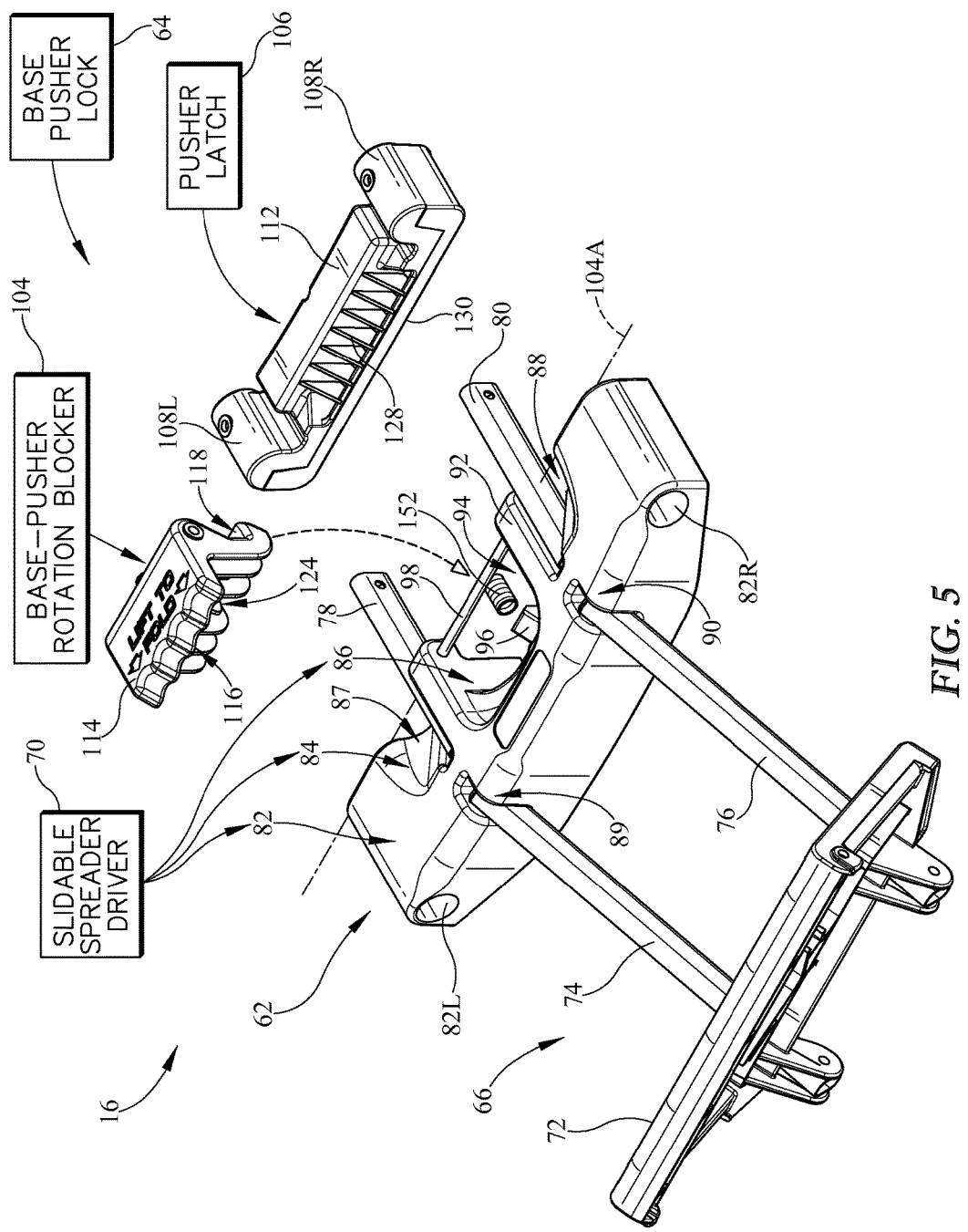
FIG. 5 is a partial exploded perspective view of the hand-truck mode changer included in the hand truck of FIGS. 1 and 2 showing, from bottom left to top right, that the hand-truck mode changer includes the wheel-spreader system including the lower linkage, the slidable spreader driver, and the upper linkage and the base-pusher lock including the base-pusher rotation blocker and the pusher latch.

Illustratively, hand-truck mode changer 16 includes a wheel-spreader system 62 and a base-pusher lock 64 as shown in FIGS. 2 and 5. Wheel-spreader system 62 is configured to provide means for pivoting wheels 23, 25 from the unfolded rolling position to the folded storage position in response to movement of base pusher 14 from the upright hand-truck position to the storage position. Base-pusher lock 64 provides means for holding base pusher 14 in the upright hand-truck position relative to load-support frame 18.

Figure 11:
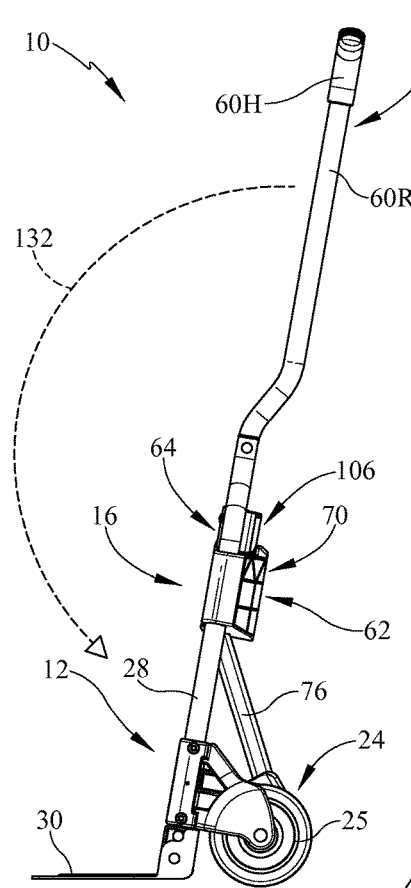
FIGS. 11-16 show conversion of the hand truck of FIG. 1 from the expanded use mode shown in FIGS. 11 and 12 to the compact flat storage mode shown in FIGS. 15 and 16.
Figure 12:
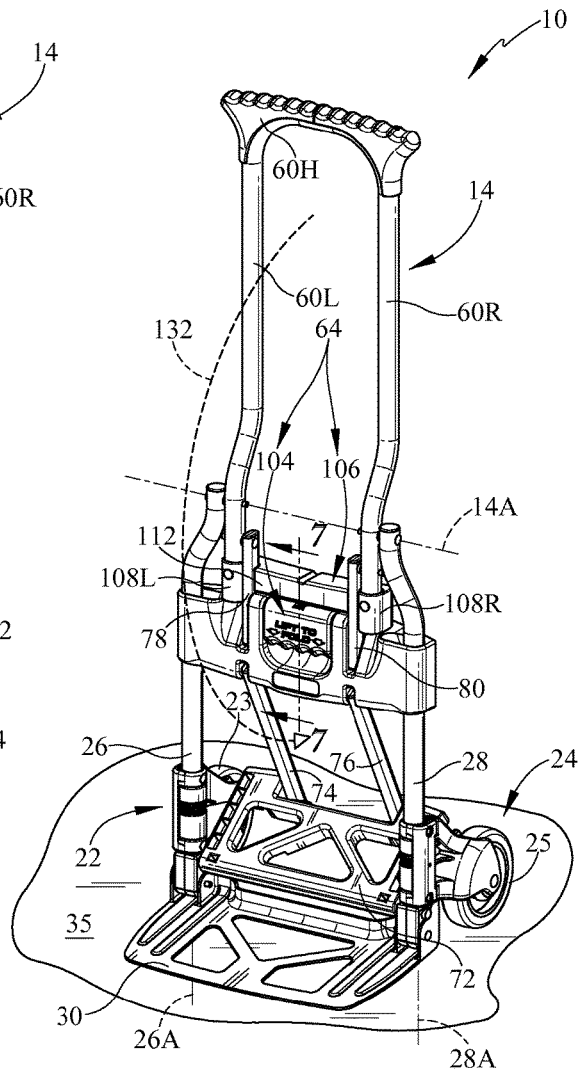

Base-pusher lock 64 is coupled to wheel-spreader system 62 and configured to lock selectively base pusher 14 in the upright hand-truck position relative to rolling base 12 and block sliding movement of spreader driver 70 relative to rolling base 12 to hold hand truck 10 in the expanded use position as shown in FIGS. 11 and 12. Base-pusher lock 64 is configured to move between a LOCKED CONFIGURATION, shown in FIG. 7, wherein base pusher 14 is kept in the upright hand-truck position and an UNLOCKED CONFIGURATION, shown in FIG. 8, wherein base pusher 14 is freed to rotate about base-pusher pivot axis 14A from the upright hand-truck position toward the storage position.

Figure 4:
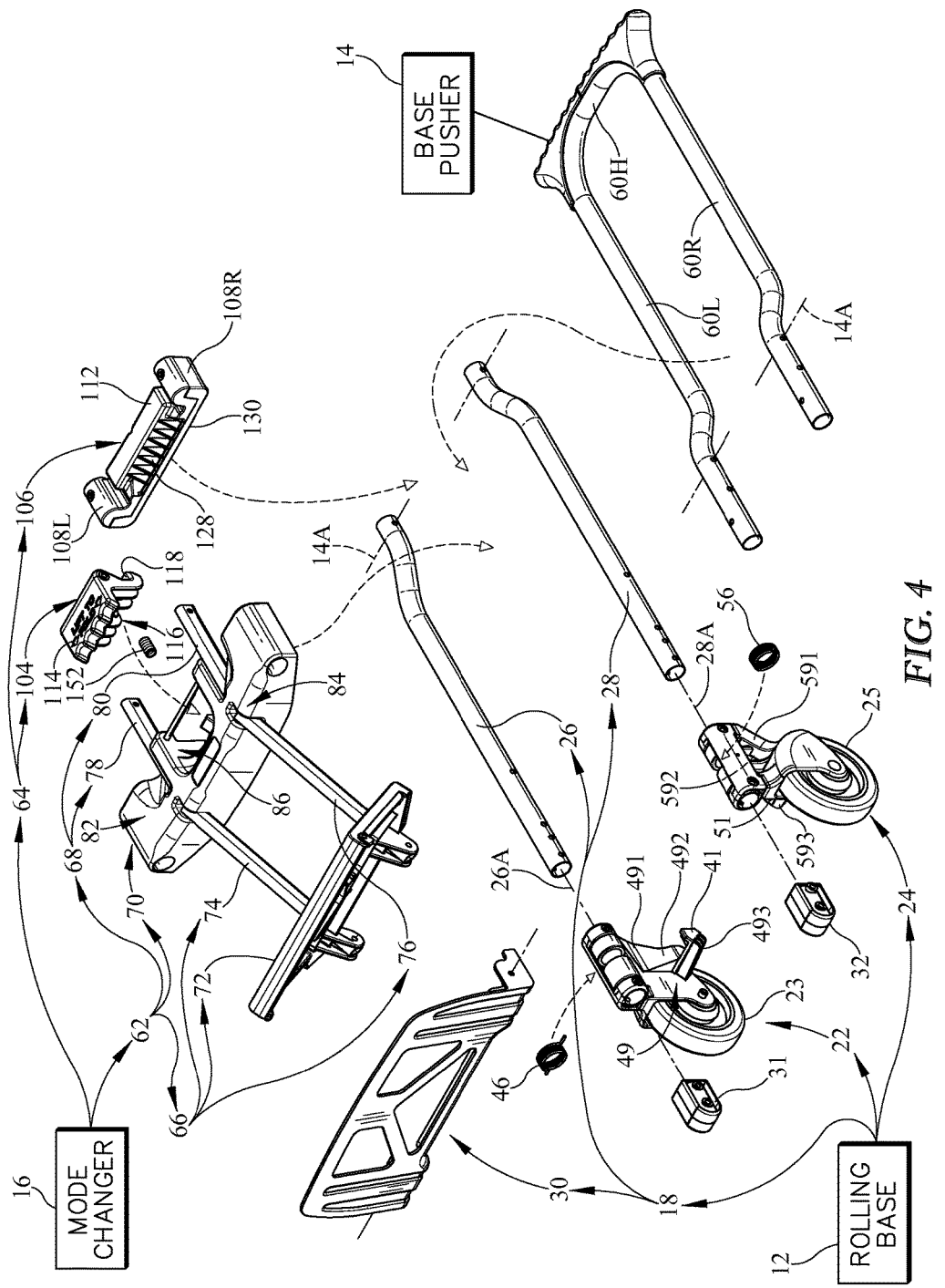
FIG. 4 is an exploded perspective view of the collapsible hand truck of FIGS. 1 and 2 showing several hand truck subassemblies and, in particular, showing (1) a rolling base including left and right wheel support rails and left and right wheel units formed to be mounted on lower ends of the wheel support rails for pivotable movement between unfolded rolling positions shown in FIG. 1 and folded storage positions as shown in FIG. 2; (2) a base pusher; and (3) a hand-truck mode changer comprising a wheel-spreader system including a lower linkage adapted to be coupled to the left and right wheel units, a spreader driver formed to be mounted for back-and-forth sliding movement on the wheel support rails, and an upper linkage adapted to be coupled to the spreader driver and to the pivotable base pusher and to cooperate with the spreader driver and the lower linkage to cause the wheel units to pivot between folded rolling positions and unfolded storage positions and a base-pusher lock including a pusher latch adapted to couple to the lower end of the base pusher and a base-pusher rotation blocker adapted to couple selectively with the pusher latch to hold the hand truck in the expanded use position in response to pivoting movement of the base pusher about the base-pusher pivot axis from the storage position shown in FIG. 2 to the unfolded hand-truck position shown in FIG. 1.

Base-pusher lock 64 includes a base-pusher rotation blocker 104 and a pusher latch 106 as shown in FIGS. 3-5. Pusher latch 106 is coupled to lower ends of left and right legs 60L, 60R of base pusher 14 for movement therewith. As shown in FIGS. 11-16, pusher latch 106 is configured to rotate about base-pusher pivot axis 14A with base pusher 14 to engage with base-pusher rotation blocker 104. Base-pusher rotation blocker 104 is coupled to wheel-spreader system 62 and engaged with pusher latch 106 to block selectively movement of base pusher 14 relative to rolling base 12 to maintain hand truck 10 in the expanded use mode when base-pusher lock 64 is in the LOCKED CONFIGURATION. Base-pusher rotation blocker 104 is arranged to be moved by a user to cause base-pusher lock 64 to move to the UNLOCKED CONFIGURATION to free base pusher 14 and allow the user to rotate base pusher 14 to the storage position to reconfigure hand truck 10 to the flat storage mode.

Hand truck 10 includes rolling base 12, base pusher 14 coupled to rolling base 12, and hand-truck mode changer 16 as shown, for example, in FIGS. 1 and 2. Rolling base 12 is adapted for supporting goods to be transported by hand truck 10 when hand truck 10 is in the expanded use mode as shown in FIG. 1. Base pusher 14 is coupled to load-support frame 18 included in rolling base 12 near an upper end of load-support frame 18 for movement relative to rolling base 12 about base-pusher pivot axis 14A and is adapted to provide a grip for a user during use of hand truck 10. Hand-truck mode changer 16 is coupled to rolling base 12 and to base pusher 14 and facilitates reconfiguration of hand truck 10 between the expanded use mode, shown in FIG. 1, and the flat storage mode, shown in FIG. 2, by moving wheels 23, 25 included in rolling base 12 and by holding base pusher 14 in the upright hand-truck position relative to rolling base 12.

In illustrative embodiments, rolling base 12 comprises load-support frame 18, left wheel unit 22, and right wheel unit 24 as shown in FIGS. 3 and 4. Load-support frame 18 is adapted to be pushed and pulled by base pusher 14 to move goods supported by rolling base 12. Left and right wheel units 22, 24 are coupled to load-support frame 18 and are arranged to engage and roll on ground 35 underlying rolling base 12.

Load-support frame 18 includes left and right wheel support rails 26, 28 arranged to lie in spaced-apart parallel relation to one another and toe-plate shelf 30 as shown in FIGS. 3 and 4. Toe-plate shelf 30 is mounted on lower ends of wheel-support rails 26, 28 for pivotable movement about a shelf pivot axis 30A between an active extended position shown in FIG. 1 used in the expanded use mode of hand truck 10 and an inactive flat position shown in FIG. 2 used in the flat storage mode. Load-support frame 18 also includes left end cap 31 and right end cap 32. Left end cap 31 is adapted to be mounted on a lower end of left wheel-support rail 26 after left wheel unit 22 is mounted on left wheel-support rail 26 and a right end cap 32 is adapted to be mounted on a lower end of right wheel-support rail 28 after right wheel unit 24 is mounted on right wheel-support rail 28.

Left wheel unit 22 is mounted on left wheel-support rail 26 for pivotable movement about left pivot axis 26A as shown in FIG. 2. Right wheel unit 24 is mounted on right wheel-support rail 28 for pivotable movement about right pivot axis 28A that is arranged to lie in spaced-apart parallel relation to left pivot axis 26A as suggested in FIGS. 2-4. Each of left and right wheel units 22, 24 may pivot about its pivot axis 26A or 28A between unfolded rolling position shown in FIG. 1 and the folded storage position shown in FIG. 2.

Left wheel unit 22 includes left wheel 23 and couples left wheel 23 to left wheel-support rail 26 of load-support frame 18 for movement about left pivot axis 26A as suggested in FIG. 4. Right wheel unit 24 includes right wheel 25 and couples right wheel 25 to right wheel-support rail 28 of load-support frame 18 for movement about right pivot axis 28A. Wheels 23, 25 move about pivot axes 26A, 28A from the unfolded rolling positions, shown in FIGS. 11 and 12, to the folded storage positions shown in FIGS. 15 and 16. Movement of wheels 23, 25 is independent of movement of toe-plate shelf 30.

In the unfolded rolling position, wheels 23, 25 are arranged to extend downwardly to engage a ground 35 underlying hand truck 10 as shown in FIGS. 1, 11, and 12. More specifically, left wheel 23 and right wheel 25 are arranged to extend in the same downward direction away from load-support frame 18 when in the unfolded rolling position.

Figures 15, 16:
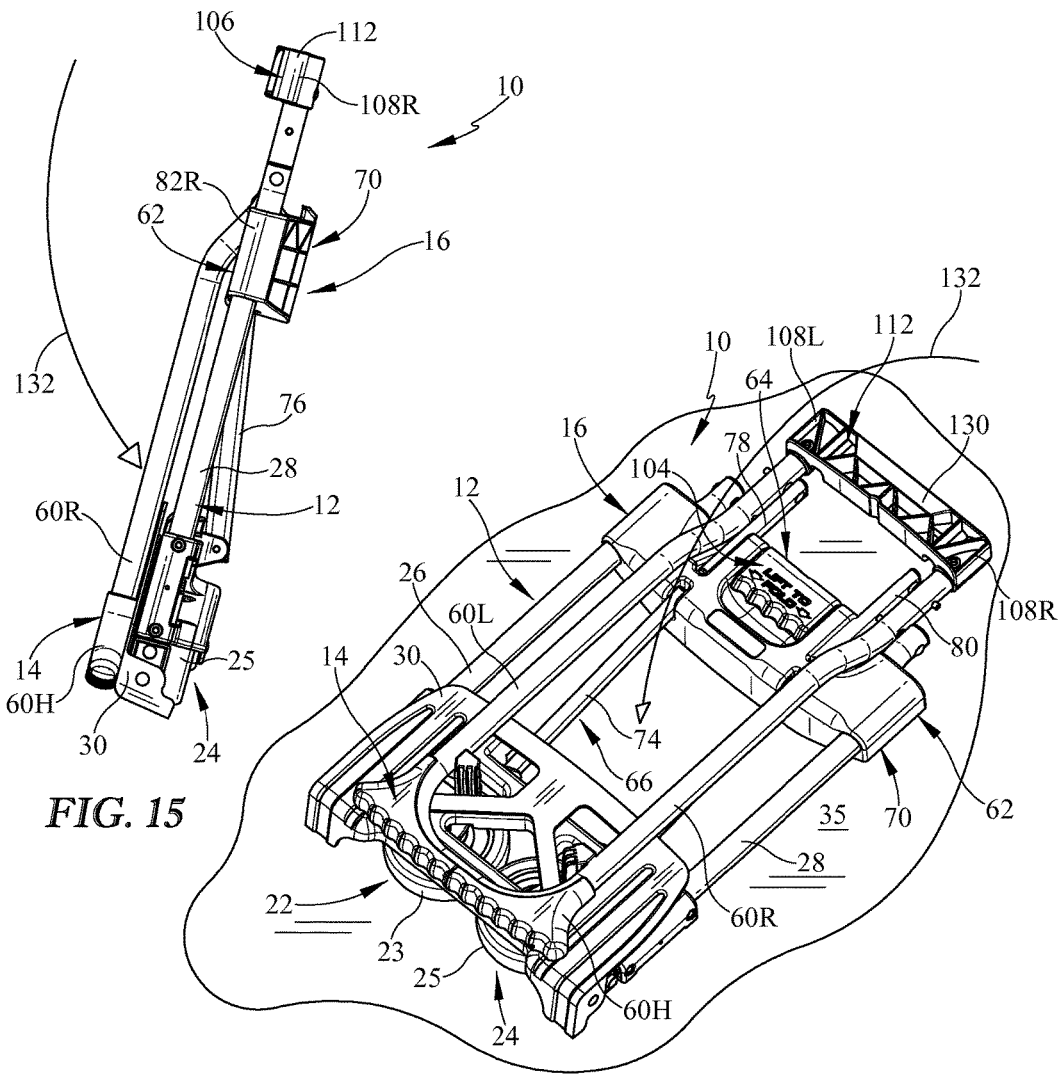

In the folded storage positions, wheels 23, 25 are arranged to extend inwardly toward one another to cause hand truck 10 to be flattened as shown in FIGS. 2, 15, and 16. More specifically, left wheel 23 is arranged to extend from left wheel-support rail 26 toward right wheel 25 and right wheel-support rail 28 of load-support frame 18 when in the folded storage position. Correspondingly, right wheel 25 is arranged to extend from right wheel-support rail 28 toward left wheel 23 and left wheel-support rail 26 of load-support frame 18 when in the folded storage position.

Hand truck 10 also includes spring means 46, 56 for normally and yieldably pivoting each wheel unit 22, 24 about its pivot axis 26A or 28A to assume the folded storage position in which wheels 23, 25 in wheel units 22, 24 disengage ground 35 underlying the rolling base 12 and wheel 23 in left wheel unit 22 is arranged to extend toward wheel 23 in right wheel unit 24 as suggested in FIGS. 2 and 16. The spring means 46, 56 illustratively includes a left spring 46 coupled to left wheel-support rail 26 and left wheel unit 22 and a right spring 56 coupled to right wheel-support rail 28 and right wheel unit 24 as suggested in FIGS. 3 and 4.

Left wheel unit 22 includes a brace bracket 42 coupled to left wheel-support rail 26, a wheel support 44 coupled to left wheel-support rail 26 for movement about left pivot axis 26A, and left wheel 23 coupled to wheel support 44 as suggested in FIG. 3. Wheel-bias spring 46 is coupled to left wheel-support rail 26 and to wheel support 44. Wheel support 44 includes a rail receiver 47, a fork 48, a cam block 49, and a hook 41. Wheel-bias spring 46 is arranged to extend around a portion of left wheel-support rail 26 and to engage brace bracket 42 and wheel support 44 to bias wheel support 44, along with left wheel 23, toward the folded storage position.

Wheel support 44 of left wheel unit 22 is illustratively a monolithic component formed to include rail receiver 47, fork 48, cam block 49, and hook 41 as shown in FIGS. 3 and 4. Rail receiver 47 is coupled to left wheel-support rail 26. Fork 48 is coupled to rail receiver 47 and is configured to support left wheel 23 for rotation relative to wheel support 44. Cam block 49 is coupled to fork 48 and interacts with spreader plate 72 of lower linkage 66 of hand-truck mode changer 16 when left wheel 23 is moved from the folded storage position to the unfolded rolling position. Hook 41 extends from cam block 49 and is configured to receive base pusher 14 when base pusher 14 is in the storage position as shown in FIGS. 1 and 16 so that base pusher 14 is held in place relative to rolling base 12.

Right wheel unit 24 includes a brace bracket 52 coupled to right wheel-support rail 28, a wheel support 54 coupled to right wheel-support rail 28 for movement about right pivot axis 28A, and a right wheel 25 coupled to wheel support 54 as shown in FIG. 3. Wheel-bias spring 56 is coupled to right wheel-support rail 28 and to wheel support 54. Wheel-bias spring 56 is arranged to extend around a portion of right wheel-support rail 28 and to engage brace bracket 52 and wheel support 54 to bias wheel support 54, along with right wheel 25, toward the folded storage position. Right wheel unit 24 is similar to left wheel unit 22 and is not discussed in detail.

Cam block 49 included in wheel support 44 of left wheel unit 22 is arranged to lie alongside wheel 23 and engage a portion of spreader plate 72 included in lower linkage 66 of hand-truck mode changer 16 during pivoting motion of base pusher 14 about base-pusher pivot axis 14A to change the mode of hand truck 10 from the flat storage mode to the expanded use mode as suggested in FIG. 4. Similarly, right wheel unit 24 includes a cam block 59 near right wheel 25. Cam block 49 includes, in sequence, a ROOT section 491, a CAM section 492, and a LOCK section 493 and cam block 59 includes, in sequence, a ROOT section 591, a CAM section 592, and a LOCK section 593.

Spreader plate 72 engages or lies adjacent to ROOT sections 491, 591 when hand truck 10 is in the flat storage mode as shown in FIGS. 15 and 16. Spreader plate 72 engages CAM sections 492, 592 during the movement of lower linkage 66 relative to rolling base 12 that accompanies a change of hand truck 10 from the flat storage mode to the expanded use mode. In this circumstance, spreader plate 72 is moved toward wheels 23, 25 to engage CAM sections 492, 592 and ride thereon in camming relation to move the companion wheel unit 22 or 24 from the folded storage position to the unfolded rolling position and thus spread wheel units 22, 24 apart. Lastly, spreader plate 72 engages LOCK sections 493, 593 (e.g., channels) formed in a hook (41 or 51) included in cam block (49 or 59) as shown in FIGS. 11 and 12 to retain wheel units 22, 24 in their unfolded rolling positions.

Base pusher 14 is mounted on left and right wheel support rails 26, 28 of rolling base 12 for pivotable movement about base-pusher pivot axis 14A as shown in FIGS. 1 and 2. In the upright hand-truck position show in FIGS. 1 and 11, base pusher 14 is arranged to extend generally parallel to load-support frame 18 of rolling base 12 to cause hand truck 10 to provide a two-wheeled stand-up dolly for transporting goods. Base pusher 14 is arranged to extend generally parallel with and away from wheel-support rails 26, 28 of load-support frame 18 when base pusher 14 is in the upright hand-truck position. In the storage position, base pusher 14 is arranged to lie alongside left and right wheel support rails 26, 28 on top of rolling base 12 in the flat storage mode of hand truck 10 as shown in FIG. 2. Base pusher 14 is pivotable in a first direction from the upright hand-truck position through about a 180-degree angle toward left and right wheel support rails 26, 28 relative to base-pusher pivot axis 14A to reach the storage position to establish the flat storage mode of hand truck 10.

Base pusher 14 includes left leg 60L, right leg 60R, and U-shaped handgrip 60H interconnecting upper ends of legs 60L, 60R as shown in FIGS. 1-4. Left and right legs 60L, 60R of base pusher 14 are mounted on left and right wheel-support rails 26, 28 of rolling base 12 for pivotable movement about base-pusher pivot axis 14A in a first direction from the upright hand-truck position, shown in FIG. 2, through about a 180 degree angle toward left and right wheel-support rails 26, 28 to reach the storage position arranged to lie alongside left and right wheel-support rails 26, 28 on top of rolling base 12 in a flat storage mode of hand truck 10

Figure 7:
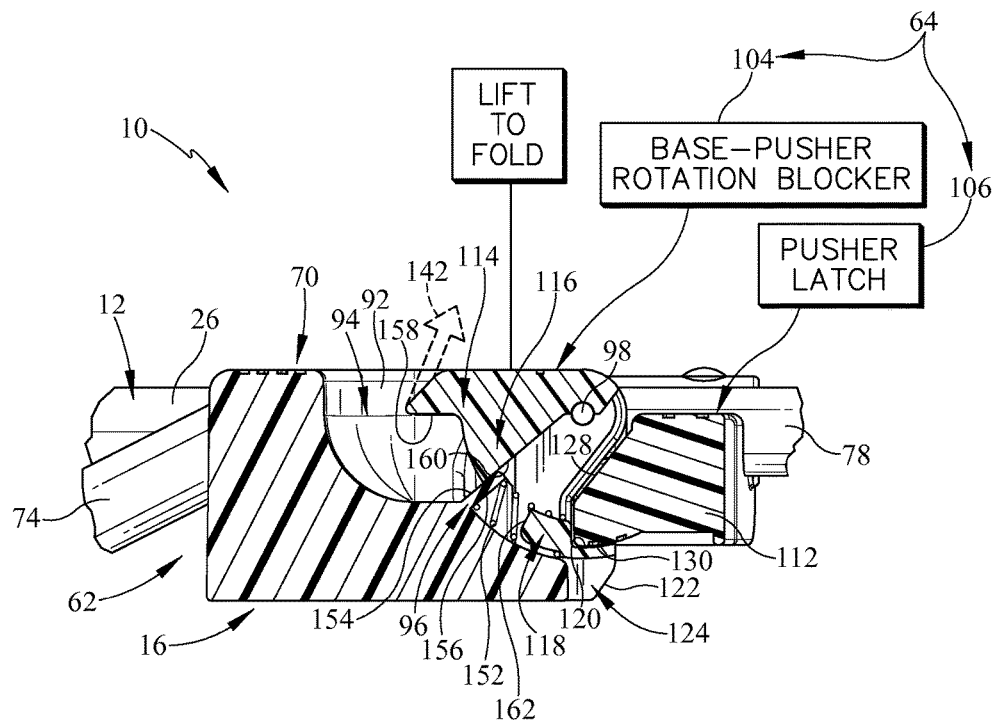
FIG. 7 is sectional view of the hand-truck mode changer while the hand truck is in the expanded use mode taken along line 7-7 of FIG. 12 suggesting that the base-pusher lock may be pulled upwardly by a user to move the base-pusher lock from a LOCKED CONFIGURATION to an UNLOCKED CONFIGURATION in which the base pusher is freed to move from the upright hand-truck position toward the storage position to collapse the hand truck into the compact storage mode.
Figure 8:
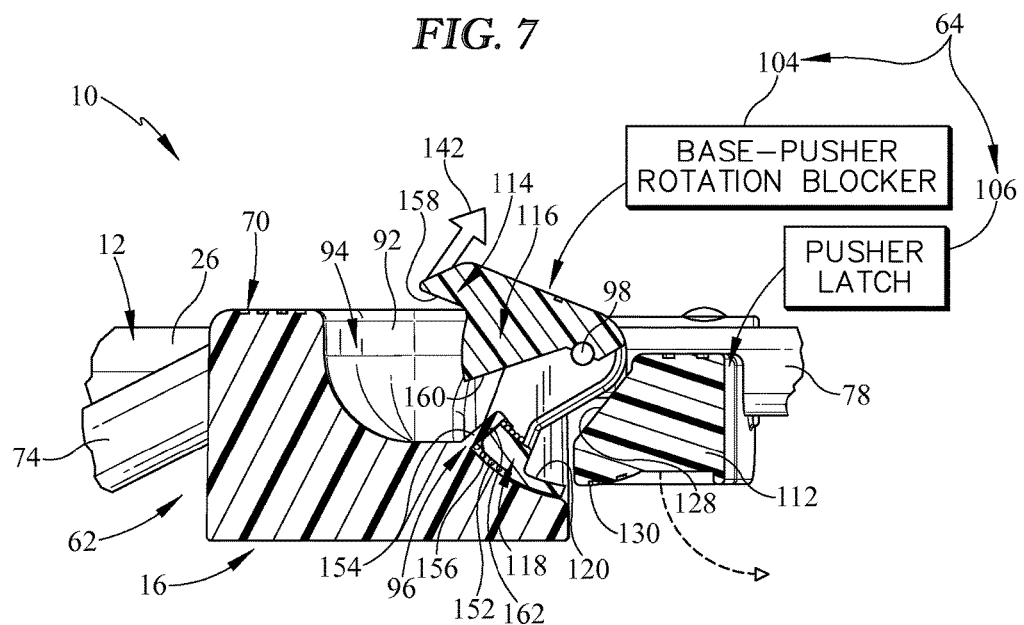
FIG. 8 is sectional view of the hand-truck mode changer after the base-pusher lock has been pulled upwardly by a user to move the base-pusher lock from the LOCKED CONFIGURATION to the UNLOCKED CONFIGURATION to free the base pusher for movement from the upright hand-truck position toward the storage position to collapse the hand truck into the compact storage mode.

Hand-truck mode changer 16 is coupled to rolling base 12 and to base pusher 14 and facilitates reconfiguration of hand truck 10 between modes by moving wheels 23, 25 included in rolling base 12 and by holding base pusher 14 in a predetermined position relative to rolling base 12 as shown in FIGS. 1 and 2. Hand-truck mode changer 16 is configured to provide means for locking selectively base pusher 14 in the upright hand-truck position relative to rolling base 12 to hold hand truck 10 in the expanded use mode as shown in FIGS. 7 and 8.

Figure 6:
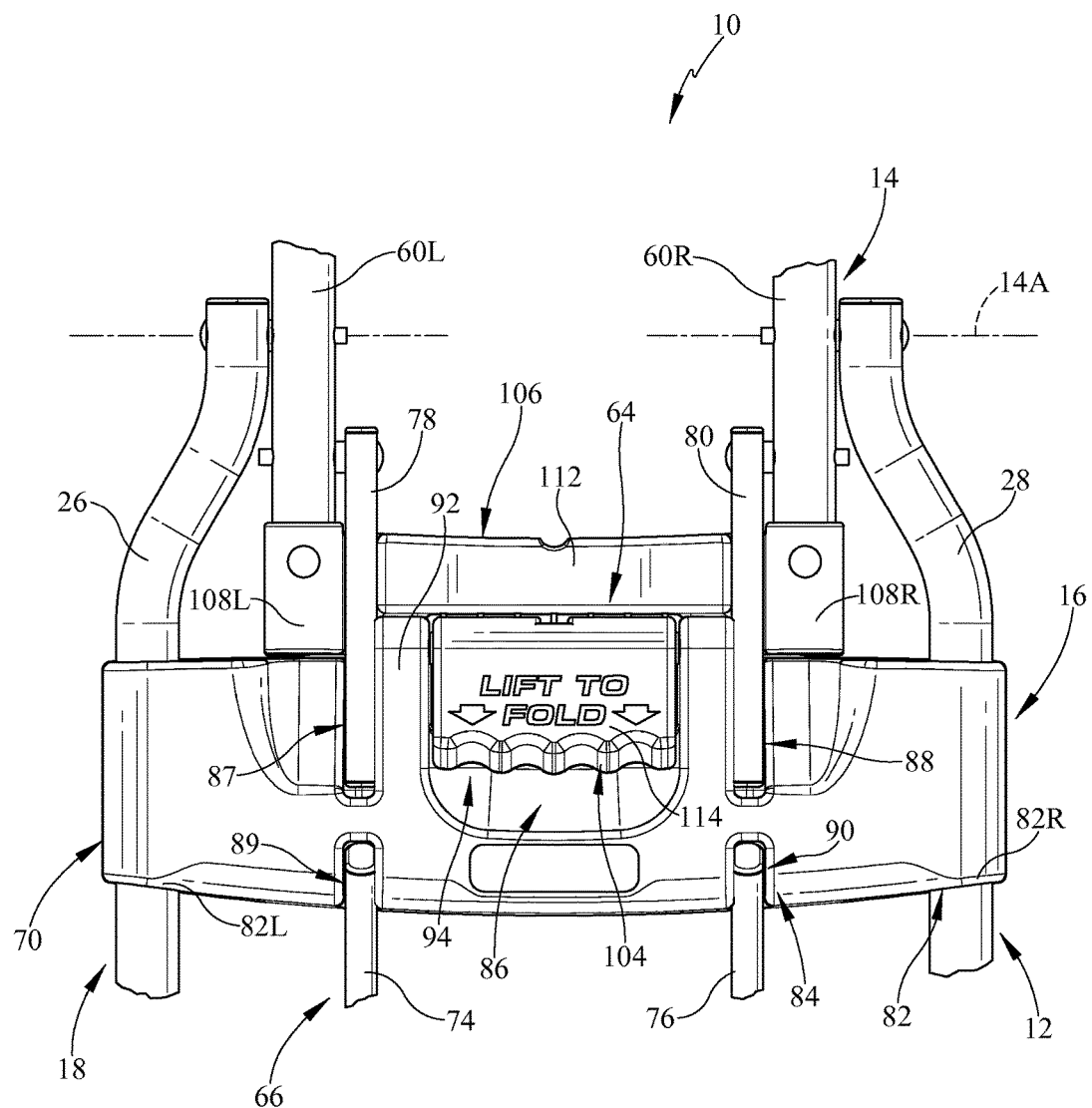
FIG. 6 is a partial elevation view of the hand-truck mode changer included in the hand truck while the hand truck is locked in the expanded use mode shown in FIG. 2.

Hand-truck mode changer 16 includes wheel-spreader system 62 and base-pusher lock 64 as shown in FIGS. 5 and 6. Wheel-spreader system 62 is configured to provide means for pivoting the spring-biased left and right wheel units 22, 24 about their pivot axes 26A and 28A to move relative to left and right wheel support rails 26, 28 from the unfolded rolling positions shown in FIGS. 1 and 12 to assume the folded storage positions shown in FIGS. 2 and 16 in response to pivoting movement of base pusher 14 relative to rolling base 12 about base-pusher pivot axis 14A by a user in the field to establish the flat storage mode of hand truck 10. Base-pusher lock 64 is configured to provide means for locking selectively base pusher 14 in the upright hand-truck position relative to rolling base 12 to hold hand truck 10 in the expanded use mode as shown in FIGS. 11 and 12.

Wheel-spreader system 62 includes lower linkage 66, upper linkage 68, and spreader driver 70 as shown in FIG. 5. Lower linkage 66 interconnects spreader driver 70 and pivotable left and right wheel units 22, 24 as shown in FIG. 12. Upper linkage 68 interconnects spreader driver 70 and pivotable base pusher 14 as shown in FIG. 6. Slidable spreader driver 70 is mounted for sliding movement on wheel-support rails 26, 28 of rolling base 12.

Figures 13, 14:
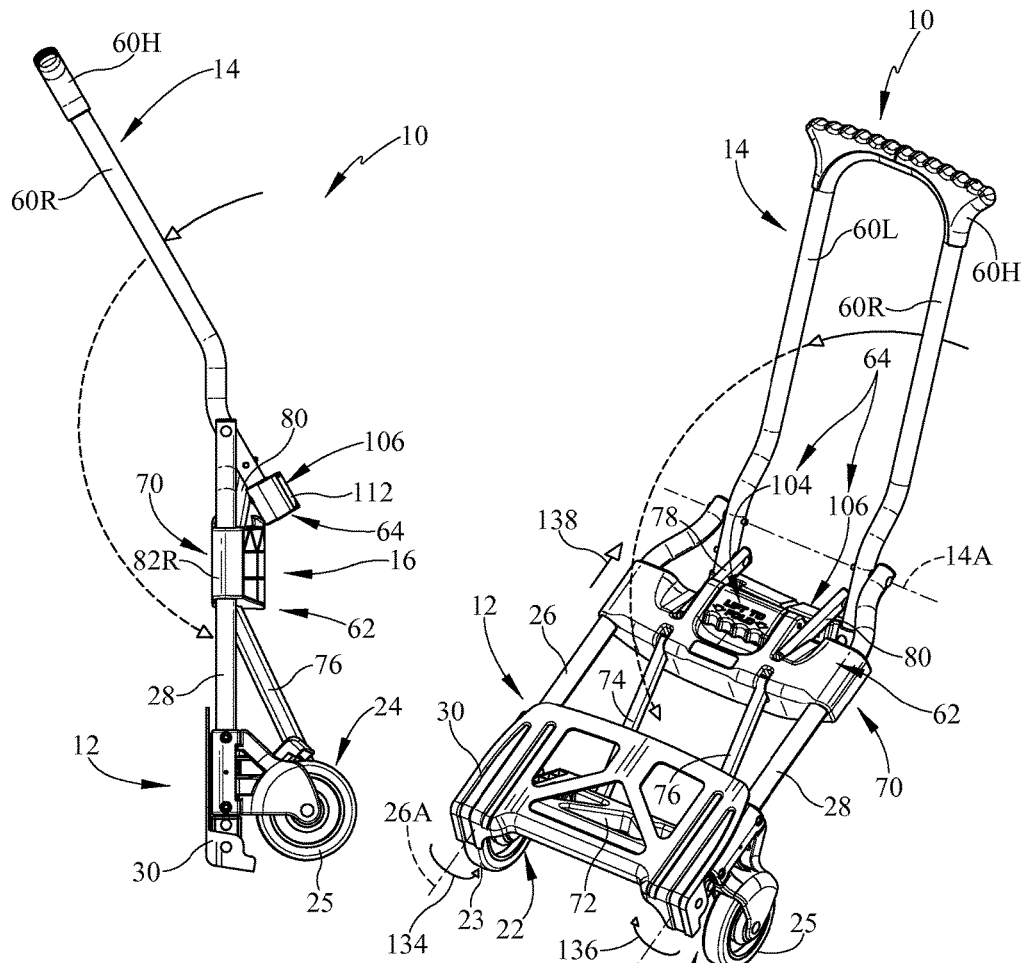

Lower linkage 66 illustratively includes a spreader plate 72 and wheel links 74, 76 as shown in FIGS. 3 and 4. Spreader plate 72 is configured to engage cam blocks 49, 59 of left and right wheel units 22, 24 to push wheel units 22, 24 and wheels 23, 25 in those wheel units 22, 24 from the folded storage position to the unfolded rolling position as shown in FIGS. 13 and 14. Spreader plate 72 is received in LOCK (channel) sections 493, 593 formed in hooks 41, 51 attached to corresponding wheels 23, 25 when wheels 23, 25 are moved to the unfolded-rolling position to hold wheels 23, 25 in the unfolded-rolling position and to brace wheels 23, 25 during use of hand truck 10. Wheel links 74, 76 are pivotably coupled to spreader plate 72 to pivot relative to spreader plate 72 and to slidable spreader driver 70 to pivot relative to slidable spreader driver 70.

Upper linkage 68 is coupled to slidable spreader driver 70 and to base pusher 14 to interconnect slidable spreader driver 70 and base pusher 14 as shown in FIGS. 5 and 6. Upper linkage 68 includes pusher links 78, 80, as shown, for example, in FIGS. 3-6. Pusher links 78, 80 are pivotably coupled at one end to spreader driver 70 and at opposite ends to pivotable base pusher 14 at lower ends of left and right legs 60L, 60R as shown in FIG. 6.

Slidable spreader driver 70 is coupled to load-support frame 18 to slide along load-support frame 18 as shown in FIGS. 6 and 14. Slidable spreader driver 70 is coupled to load-support frame 18 to slide relative to load-support frame 18 and to base pusher 14 through upper linkage 68. Spreader driver 70 includes a rail receiver 82, a link carriage 84, and a lock receiver 86 as shown in FIGS. 5 and 6. Rail receiver 82 receives left and right wheel-support rails 26, 28 to couple spreader driver 70 to rolling base 12 for sliding movement relative to load-support frame 18. Link carriage 84 interconnects spreader driver 70 with lower linkage 66 and upper linage 68. Lock receiver 86 couples wheel-spreader system 62 to base-pusher lock 64.

Rail receiver 82 includes left rail receiver 82L and right rail receiver 82R as shown in FIG. 5. Left rail receiver 82L is formed to receive left wheel-support rail 26 included in rolling base 12. Right rail receiver 82R is formed to receive right wheel-support rail 28. Left and right rail receivers 82L, 82R are adapted to allow spreader driver 70 to slide along wheel-support rails 26, 28 to cause wheels 23, 25 to move from the unfolded rolling positions to the folded storage positions.

Link receiver 84 includes left upper receiver 87, right upper receiver 88, left lower receiver 89, and right lower receiver 90 as shown in FIG. 5. In one example, receivers 87, 88, 89, 80 are formed to extend into spreader driver 70. Wheel links 74, 76 of lower linkage 66 are pivotably coupled to receivers 89, 90 respectively. Pusher links 78, 80 of upper linkage 68 are pivotably coupled to receivers 87, 88 respectively. Wheel links 74, 76 and pusher links 78, 80 are coupled to link receiver 84 with fasteners. In one example, the fasteners are pins (not shown).

Lock receiver 86 includes a receiver body 92, a blocker-movement restrictor 96, and a pivot rod 98 as shown in FIGS. 5 and 6. Receiver body 92 is formed to include a blocker receiver aperture 94 adapted to receive base-pusher rotation blocker 104 of base-pusher lock 64. Blocker movement restrictor 96 extends away from receiver body 92 into blocker receiver aperture 94 toward base-pusher rotation blocker 104. Pivot rod 98 extends through blocker receiver aperture 94 and pivotably couples base-pusher rotation blocker 104 to spreader driver 70 for pivotable movement about a blocker pivot axis 104A.

Blocker movement restrictor 96 is configured to limit movement of base-pusher rotation blocker 104 as shown in FIGS. 7 and 8. Blocker movement restrictor 96 includes an upwardly facing blocker face 154 and a downwardly facing blocker face 156. Upwardly facing blocker face 154 is arranged to engage with and block base-pusher lock 64 from moving beyond the LOCKED CONFIGURATION. Downwardly facing blocker face 156 is arranged to engage with and block base-pusher lock 64 from moving beyond the UNLOCKED CONFIGURATION.

Base-pusher lock 64 is configured to lock selectively base pusher 14 in the upright hand-truck position relative to rolling base 12 and block sliding movement of spreader driver 70 relative to rolling base 12 to hold hand truck 10 in the expanded use position as shown in FIGS. 7 and 8. Base-pusher lock 64 is configured to move between the LOCKED CONFIGURATION, shown in FIG. 7, wherein base pusher 14 is kept in the upright hand-truck position and the UNLOCKED CONFIGURATION, shown in FIG. 8, wherein base pusher 14 is freed to rotate about base-pusher pivot axis 14A from the upright hand-truck position toward the storage position.

Base-pusher lock 64 includes base-pusher rotation blocker 104 and pusher latch 106 as shown in FIGS. 3-5. Pusher latch 106 is coupled to lower ends of left and right legs 60L, 60R of base pusher 14 for movement therewith. As shown in FIGS. 7-8, pusher latch 106 is configured to engage base-pusher rotation blocker 104 when base-pusher lock 64 is in the LOCKED CONFIGURATION and to rotate about base-pusher pivot axis 14A with base pusher 14 away from base-pusher rotation blocker 104 when base-pusher lock 64 is in the UNLOCKED CONFIGURATION. Base-pusher rotation blocker 104 is coupled to wheel-spreader system 62 and configured to engage with and block selectively movement of pusher latch 106 and, consequently, base pusher 14 relative to rolling base 12.

Pusher latch 106 includes a left leg receiver 108L, a right leg receiver 108R spaced apart from left leg receiver 108L, and an anchor body 112 extending between and interconnecting left and right leg receivers 108L, 108R as shown in FIGS. 5 and 6. Left leg receiver 108L receives the lower end of left leg 60L of base pusher 14 to couple pusher latch 106 to left leg 60L. Right leg receiver 108R receives the lower end of right leg 60R of base pusher 14 to couple pusher latch 106 to right leg 60R. Anchor body 112 is configured to engage with base-pusher rotation blocker 104 when base pusher 14 is in the upright hand-cart position to hold anchor body 112 and base pusher 14 in the upright hand-truck position.

Figure 9:
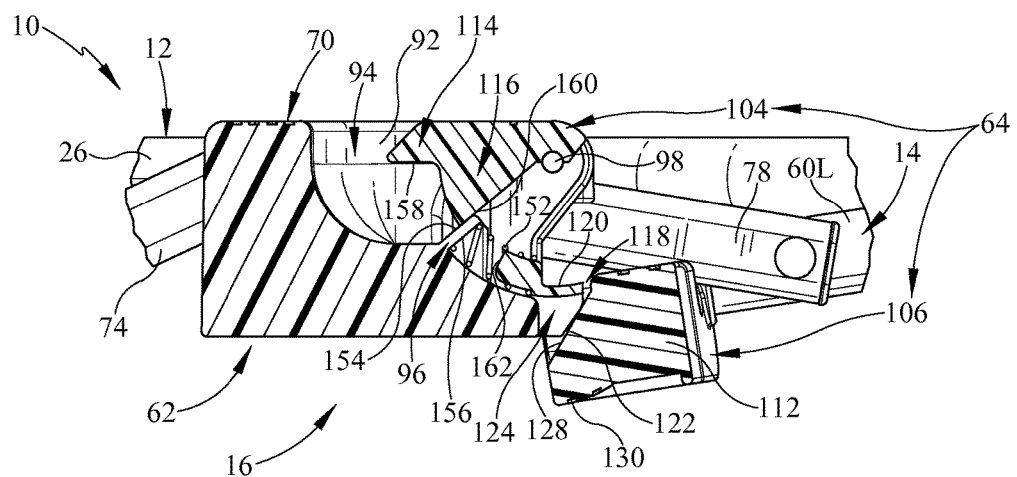
FIG. 9 is a sectional view of the base-pusher lock included in the hand-truck mode changer as the hand truck is moved from the storage mode to the expanded use mode and suggesting that the pusher latch has been rotated about the base-pusher pivot axis with the base pusher and showing that as the base pusher continues to rotate toward the upright hand-truck position, the pusher latch engages the base-pusher rotation blocker to move the base-pusher rotation blocker from a closed position to an opened position to receive the pusher latch.
Figure 10:
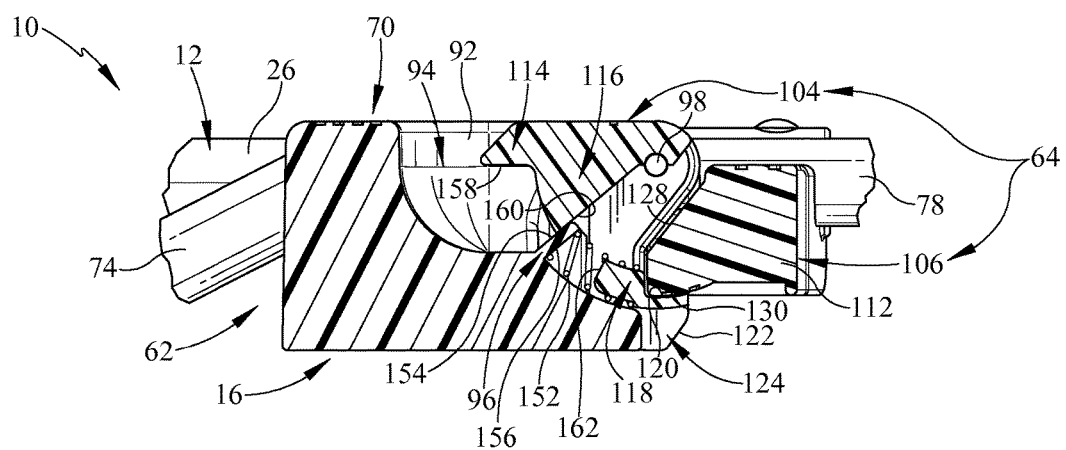
FIG. 10 is a sectional view of the base-pusher lock similar to FIG. 9 and showing that as the base pusher continues to rotate, the base-pusher rotation blocker moves back to the closed position to cause the base-pusher lock to move to the LOCKED CONFIGURATION in which the base-pusher rotation blocker blocks the pusher latch and, consequently, the base pusher from rotating from the upright hand-truck position toward the storage position to hold the hand truck in the expanded use mode.

Anchor body 112 includes a blocker ramp 128 and an engagement face 130 as shown in FIGS. 5 and 7. Engagement face 130 is arranged to be engaged by upper face 120 of catch 118 included in base-pusher rotation blocker 104 to block movement of anchor body 112 when base-pusher lock 64 is in the LOCKED CONFIGURATION as shown in FIG. 7. Upper face 120 is spaced apart from engagement face 130 when the base-pusher lock 64 is in the UNLOCKED CONFIGURATION to free anchor body 112 as shown in FIG. 8. Blocker ramp 128 is configured to move base-pusher rotation blocker 104 automatically when a user rearranges hand truck 10 from the storage mode to the expanded use mode. As shown in FIGS. 9 and 10, blocker ramp 128 is configured to move base-pusher rotation blocker 104 from the closed position to the opened position when base pusher 14 is rotated about base-pusher pivot axis 14A so that base pusher 14 is free to move to the upright hand-truck position by base-pusher rotation blocker 104.

Base-pusher rotation blocker 104 is received in blocker receiver 94 formed in spreader driver 70 and pivotably coupled to pivot rod 98 of lock receiver 86 as shown in FIGS. 6 and 7. Base-pusher rotation blocker 104 is configured to pivot about blocker pivot axis 104A between a closed position and an opened position. In the closed position, base-pusher rotation blocker 104 blocks base pusher 14 from rotating about base-pusher pivot axis 14A from the upright hand-truck position toward the storage position as shown in FIG. 7. In the opened position, base pusher 14 is freed to pivot about base-pusher pivot axis 14A from the upright hand-truck position toward the storage position at the option of the user as shown in FIG. 8.

Base-pusher rotation blocker 104 is biased toward the closed position as suggested in FIG. 7. As an example, base-pusher rotation blocker 104 is biased toward the closed position by a spring 152. Spring 152 is coupled to base-pusher rotation blocker 104 and engages downwardly facing blocker face 156 included in slidable spreader driver 70. As shown in FIGS. 9 and 10, blocker ramp 128 is configured to overcome the bias force and move base-pusher rotation blocker 104 from the closed position to the opened position when base pusher 14 is rotated about base-pusher pivot axis 14A when rearranging hand truck 10 from the storage mode to the expanded use mode.

Base-pusher rotation blocker 104 includes a lever handle 114, a stopper 116, and catch 118 as shown in FIGS. 5 and 7. Lever handle 114 is configured to be engaged by a user to pivot base-pusher rotation blocker 104 about blocker pivot axis 104A to move base-pusher rotation blocker 104 to the opened position as shown in FIGS. 7 and 8. In one example, lever handle 114 is formed to include finger-receiver grooves as shown in FIG. 6. Stopper 116 is arranged to engage blocker restrictor 96 included in spreader driver 70 to limit movement of base-pusher rotation blocker 104. As shown in FIG. 7, stopper 116 blocks base-pusher rotation blocker 104 from pivoting beyond the closed position. Catch 118 is arranged to engage anchor body 112 when base pusher 14 is in the upright hand-truck position and base-pusher rotation blocker 104 is in the closed position to block movement of base pusher 14 as shown in FIG. 7 and to disengage anchor body 112 when base-pusher rotation blocker 104 is in the opened position as shown in FIG. 8.

Lever handle 114 includes a downwardly facing lift surface 158 as shown in FIG. 7. Lift surface 158 is arranged to be gripped by a user and lifted upwardly to cause base-pusher rotation blocker 104 to pivot about blocker pivot axis 104A to move base pusher lock 64 from the LOCKED CONFIGURATION, shown in FIG. 7, to the UNLOCKED CONFIGURATION shown in FIG. 8.

Stopper 116 includes an upper stopper surface 160 arranged to engage upwardly facing blocker face 154 included in blocker restrictor 96 when base pusher lock 64 is in the LOCKED CONFIGURATION to block base-pusher rotation blocker 104 from pivoting about blocker pivot axis 104A beyond the closed position as shown in FIG. 7. Upper stopper surface 160 is arranged to be spaced apart from blocker face 154 when base-pusher rotation blocker 104 is moved to the opened position to cause base pusher lock 64 to be in the UNLOCKED CONFIGURATION as shown in FIG. 8.

Catch 118 includes an upper face 120, catch ramp 122, a blocker receiver 124, and a lower stopper surface 162 as shown in FIG. 7. Upper face 120 is arranged to engage engagement face 130 of anchor body 112 to block movement of anchor body 112 when base pusher lock 64 is in the LOCKED CONFIGURATION as shown in FIG. 7. Catch ramp 122 is configured to be contacted by anchor body 112 to overcome the bias force and cause base-pusher rotation blocker 104 to move from the closed position to the opened position when base pusher 14 is moved to the upright hand-truck position as suggested in FIGS. 9 and 10. Blocker receiver 124 is formed to receive blocker restrictor 96 included in spreader driver 70 when base-pusher rotation blocker 104 is moved from the closed position to the opened position as shown in FIG. 8. Lower stopper surface 162 is arranged to engage downwardly facing blocker face 156 included in blocker restrictor 96 when base pusher lock 64 is in the UNLOCKED CONFIGURATION to block base-pusher rotation blocker 104 from pivoting about blocker pivot axis 104A beyond the opened position as shown in FIG. 8.

Hand truck 10 is convertible by a user in the field without tools to assume the expanded use mode and the flat storage mode as shown in FIGS. 12 and 16. In the expanded use mode shown in FIGS. 11 and 12, wheels 23, 25 are in the unfolded rolling position and base pusher 14 is in the upright hand-truck position extending generally perpendicular to load-support frame 18 of rolling base 12 so that hand truck 10 provides a two-wheeled stand-up dolly hand truck for transporting goods. In the flat storage mode shown in FIGS. 15 and 16, wheels 23, 25 included in rolling base 12 are moved to the folded storage position and base pusher 14 is moved to the storage position extending along load-support frame 18 of rolling base 12 so that hand truck 10 is generally flattened for storage.

To move hand truck 10 from the expanded use mode to the flat-storage mode, as shown in FIGS. 11-16, the user pulls upwardly on lift surface 158 of lever handle 114 included in base-pusher rotation blocker 104 to cause base-pusher rotation blocker 104 to rotate about blocker pivot axis 104A and move base pusher lock 64 to the UNLOCKED POSITION as suggested by arrow 142 in FIGS. 7 and 8. In response to the user pulling lever handle 114, catch 118 is moved into spaced apart relation with anchor body 112 to free base pusher 14 to pivot about base-pusher pivot axis 14A and to free slidable spreader driver 70 to move along load-support frame 18 as shown in FIGS. 13 and 14. With base pusher 14 freed, the user then pivots base pusher 14 about base-pusher pivot axis 14A from the upright hand-truck position to the storage position in a first direction as suggested by arrow 132 in FIGS. 11 and 12.

In response to movement of base pusher 14, slidable spreader driver 70 is moved along load-support frame 18 in an upward direction as suggested by arrow 138 in FIG. 14. Hand truck 10 is in a transition mode when base pusher 14 is being rotated about base-pusher pivot axis 14A from the upright hand-truck position to the storage position to cause left and right wheel units 22, 24 to pivot and reach a midway point between the folded storage positions and the unfolded rolling positions as shown in FIGS. 13 and 14. As base pusher 14 moves from the upright hand-truck position to the storage position, spreader plate 72 allows wheel-bias springs 46, 56 to move wheels 23, 25 from the unfolded rolling positions to the folded storage positions to cause hand truck 10 to achieve the flat storage mode shown in FIG. 16. The user may move toe-plate shelf 30 to the flat position.

To move hand truck 10 from the flat-storage mode to the expanded use mode, the user pivots base pusher 14 about base-pusher pivot axis 14A from the storage position to the upright hand-truck position. As base pusher 14 rotates, blocker ramp 128 of pusher latch 106 engages catch ramp 22 of catch 118 included in base-pusher rotation blocker 104 to cause base-pusher rotation blocker 104 to rotate about blocker pivot axis 104A from the closed position to the opened position as suggested in FIGS. 9 and 10. When base pusher 14 is moved to the upright hand-truck position, base-pusher rotation blocker 104 is biased to return to the closed position to cause base-pusher lock 64 to move to the LOCKED CONFIGURATION.

In the LOCKED CONFIGURATION, base-pusher rotation blocker 104 engages pusher latch 86 to block further movement of slidable spreader driver 70 along load-support frame 18 and hold base pusher 14 in position relative to rolling base 12. Also, in response to movement of base pusher 14, wheels 23, 25 are moved about pivot axes 26A, 28A. The user may also move toe-plate shelf 30 to the active extended position from the inactive flat position.

Another illustrative hand truck 1010 is shown in FIGS. 17-23. Hand truck 1010 is adapted to convert from an expanded use mode shown in FIG. 17 to a flat storage mode shown in FIG. 18. Hand truck 1010 is substantially similar to hand truck 10 shown in FIGS. 1-16 described herein. Accordingly, similar reference numbers in the 1000 series indicate features that are generally common between hand truck 10 and hand truck 1010. The description of hand truck 10 is hereby incorporated by reference to apply to hand truck 1010, except in instances when it conflicts with the specific description and drawings of hand truck 1010.

Figures 17, 18:
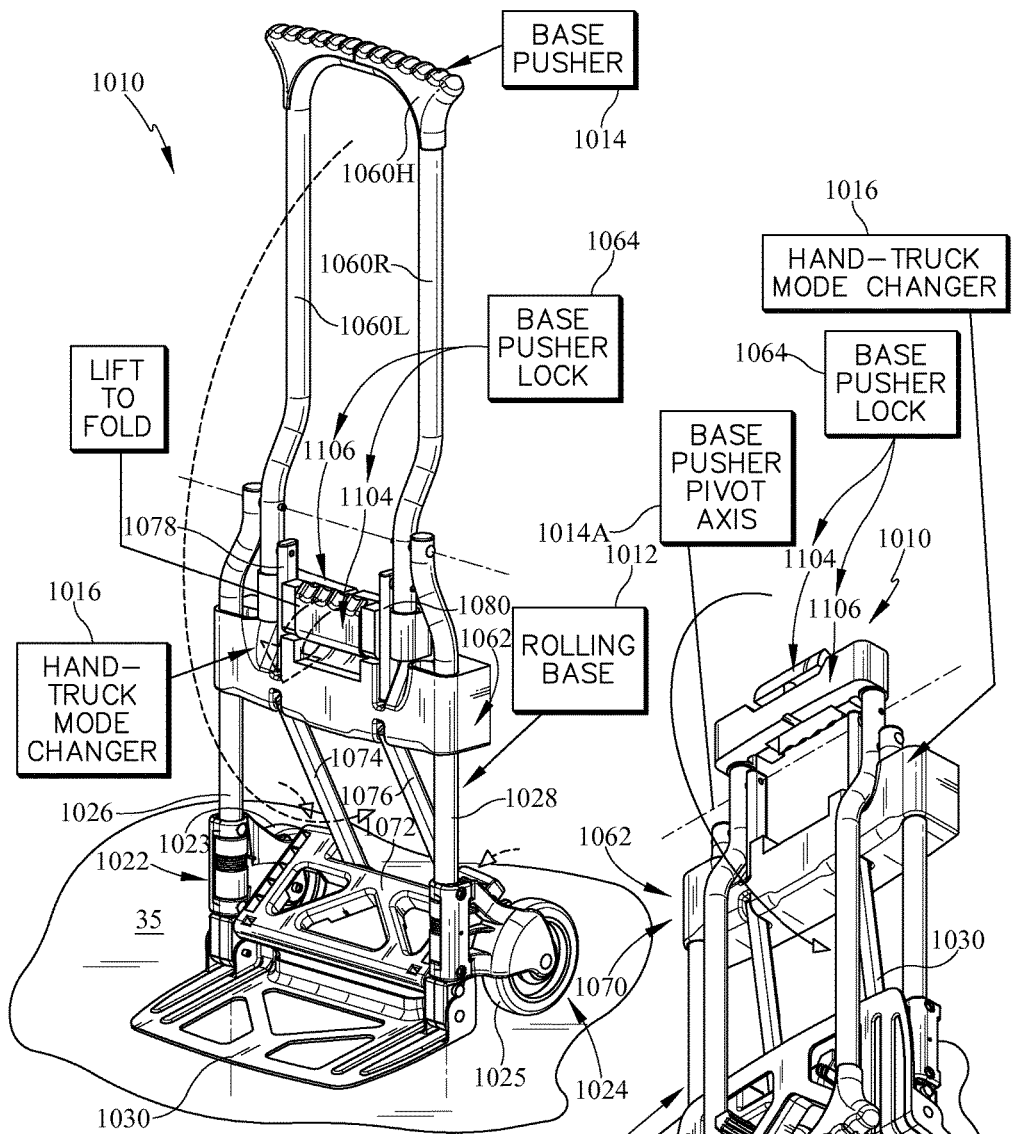
FIG. 17 is a perspective view of another embodiment of a collapsible hand truck in an expanded use mode showing that the hand truck includes a hand-truck mode changer having a base-pusher lock coupled to a base pusher included in the hand truck and the base-pusher lock is configured to hold the base pusher in the upright hand-truck position relative to a rolling base of the hand truck to maintain the hand truck in the expanded use mode.
FIG. 18 is a perspective view of the hand truck of FIG. 17 after a user has unlocked the base-pusher lock by pulling on a base-pusher rotation blocker to allow reconfiguration of the hand truck in the field to assume a compact flat storage mode by pivoting the base pusher about a base-pusher pivot axis downwardly toward the rolling base through an angle of about 180 degrees to assume a storage position extending along the rolling base.

Unlike base-pusher lock 64 of hand truck 10, base-pusher lock 1064 is coupled to base pusher 1014 of hand truck 1010 as shown in FIG. 18. Base-pusher lock 1064 is configured to lock selectively base pusher 1014 in the upright hand-truck position relative to rolling base 1012 and block sliding movement of slidable spreader driver 1070 relative to rolling base 1012 to hold hand truck 1010 in the expanded use position as shown in FIG. 17. Base-pusher lock 1064 is configured to move between the LOCKED CONFIGURATION, shown in FIG. 20, wherein base pusher 1014 is kept in the upright hand-truck position and the UNLOCKED CONFIGURATION, shown in FIG. 21, wherein base pusher 1014 is freed to rotate about base-pusher pivot axis 1014A from the upright hand-truck position toward the storage position.

Figure 19:
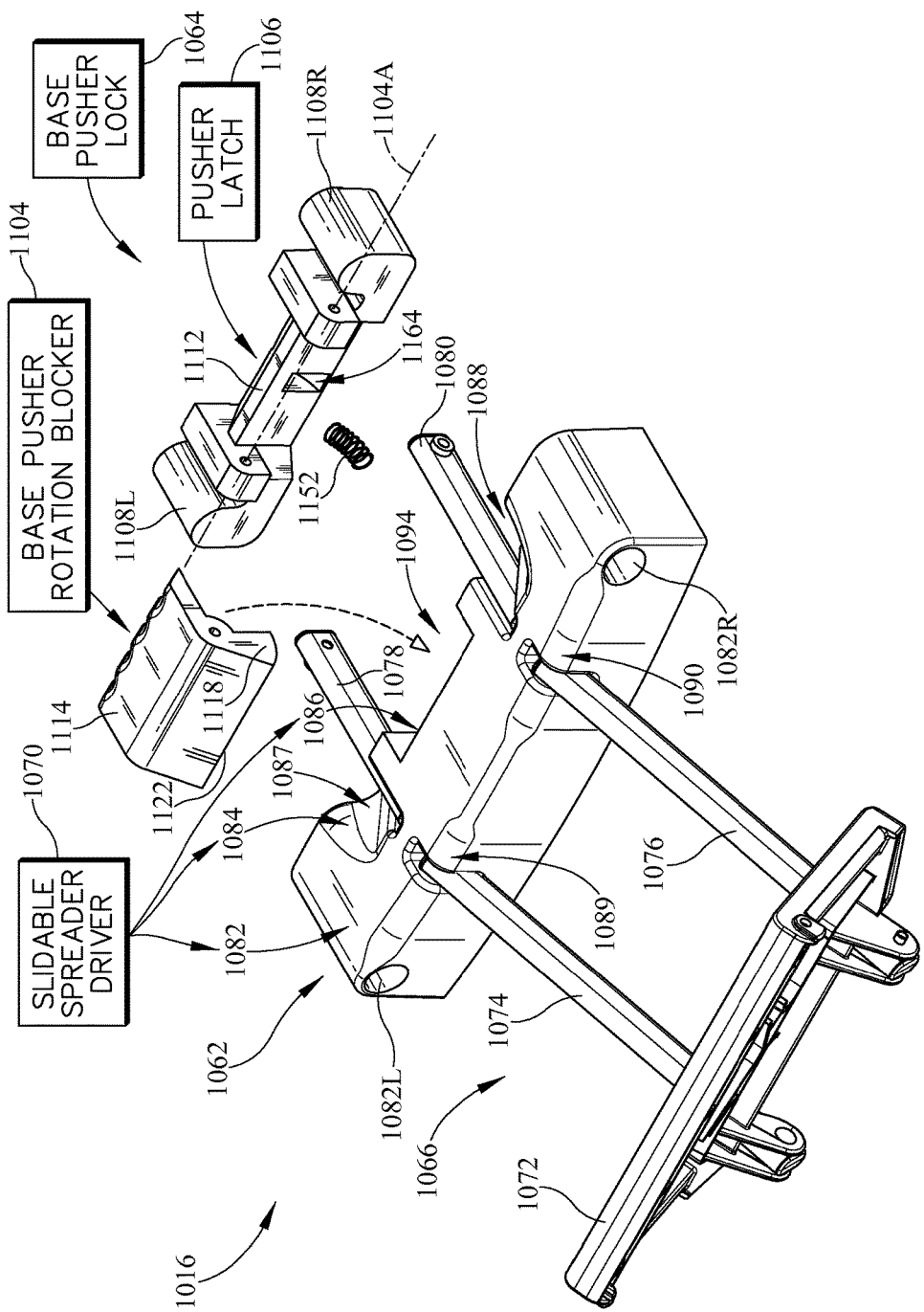
FIG. 19 is a partial exploded perspective view of the hand-truck mode changer included in the hand truck of FIGS. 17 and 18 showing, from bottom left to top right, that the hand-truck mode changer includes the wheel-spreader system including the lower linkage, the slidable spreader driver, and the upper linkage and the base-pusher lock including the base-pusher rotation blocker and the pusher latch.

Base-pusher lock 1064 includes base-pusher rotation blocker 1104 and pusher latch 1106 as shown in FIGS. 17-19. Pusher latch 1106 is coupled to lower ends of left and right legs 1060L, 1060R of base pusher 1014 for movement therewith. Base-pusher rotation blocker 1104 is coupled to pusher latch 1106. Base-pusher rotation blocker 1104 is configured to engage slidable spreader driver 1070 to block selectively movement of base pusher 1014 relative to rolling base 1012 to maintain hand truck 1010 in the expanded use mode when base-pusher lock 1064 is in the LOCKED CONFIGURATION as shown in FIG. 17. Base-pusher rotation blocker 1104 is arranged to be moved by a user to cause base-pusher lock 1064 to move to the UNLOCKED CONFIGURATION to free base pusher 1014 and allow the user to rotate base pusher 1014 to the storage position to reconfigure hand truck 1010 to the flat storage mode as shown in FIG. 18.

Pusher latch 1106 includes left leg receiver 1108L, right leg receiver 1108R spaced apart from left leg receiver 1108L, and anchor body 1112 extending between and interconnecting left and right leg receivers 1108L, 1108R as shown in FIG. 19. Left leg receiver 1108L receives the lower end of left leg 1060L of base pusher 1014 to couple pusher latch 1106 to left leg 1060L. Right leg receiver 1108R receives the lower end of right leg 1060R of base pusher 1014 to couple pusher latch 1106 to right leg 1060R.

Figure 20:
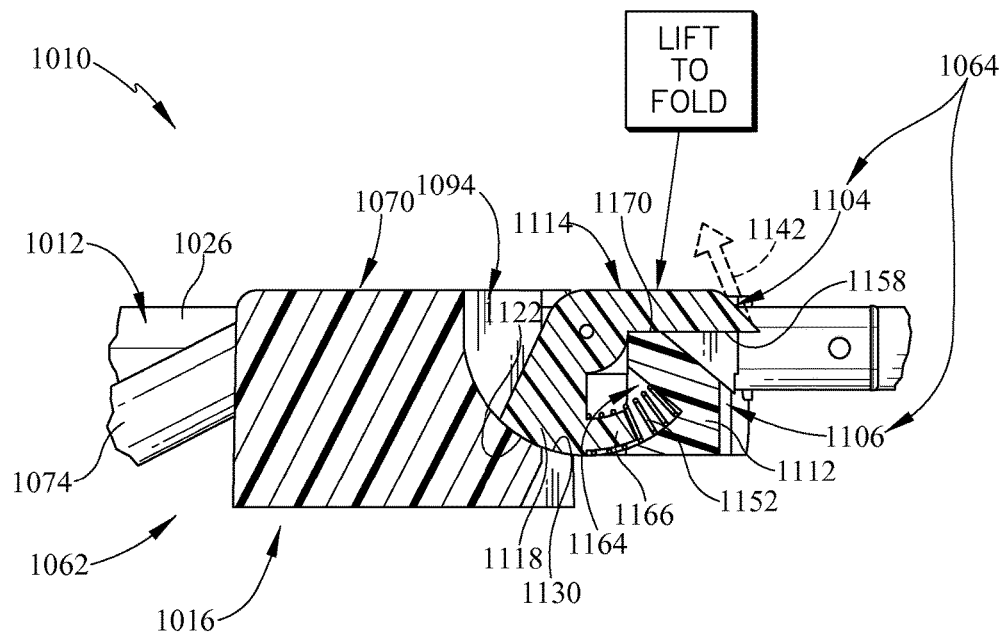
FIG. 20 is sectional view of the base-pusher lock while the hand truck is in the expanded use mode showing that the base-pusher rotation blocker is coupled to the pusher latch and suggesting that the base-pusher rotation blocker may be pulled upwardly by a user to move the base-pusher lock from a LOCKED CONFIGURATION to an UNLOCKED CONFIGURATION in which the base pusher is freed to move from the upright hand-truck position toward the storage position to collapse the hand truck into the compact storage mode.

Illustratively, anchor body 1112 is formed to include a blocker receiver 1164 as shown in FIG. 19. Blocker receiver 1164 is formed to receive spring 1152 and a release guide 1166 included in base-pusher rotation blocker 1104 as shown in FIGS. 20-23. Spring 1152 is positioned in blocker receiver 1164 between anchor body 1112 and release guide 1166 to bias base-pusher lock 1064 toward the closed position. An upper surface 1170 of anchor body 1112 is arranged to engage lever handle 1114 to block rotation of base-pusher lock 1064 beyond the closed position as shown in FIG. 20.

Figure 22:
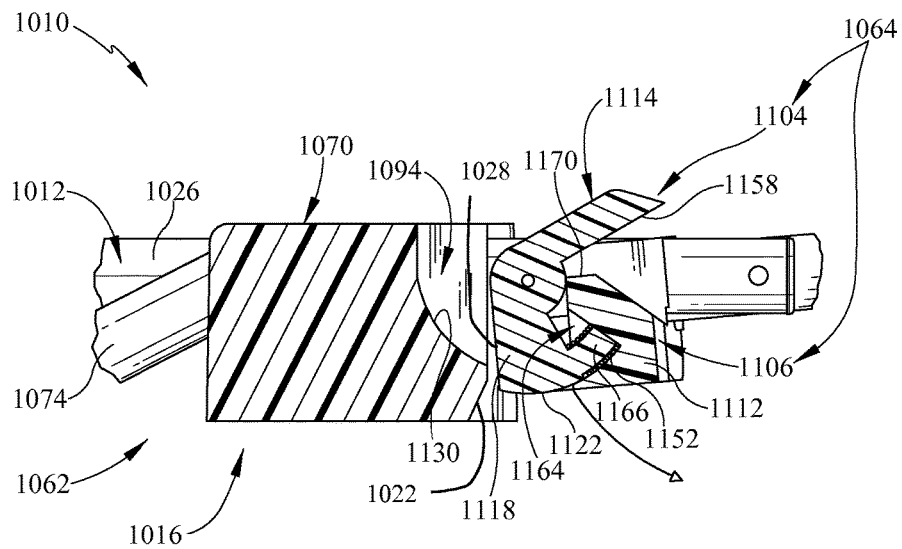
FIG. 22 is a sectional view of the base-pusher lock as the hand truck is moved from the expanded use mode to the storage mode and suggesting that the pusher latch and base pusher rotation blocker are configured to move with the base pusher as it rotates toward the storage position.
Figure 23:
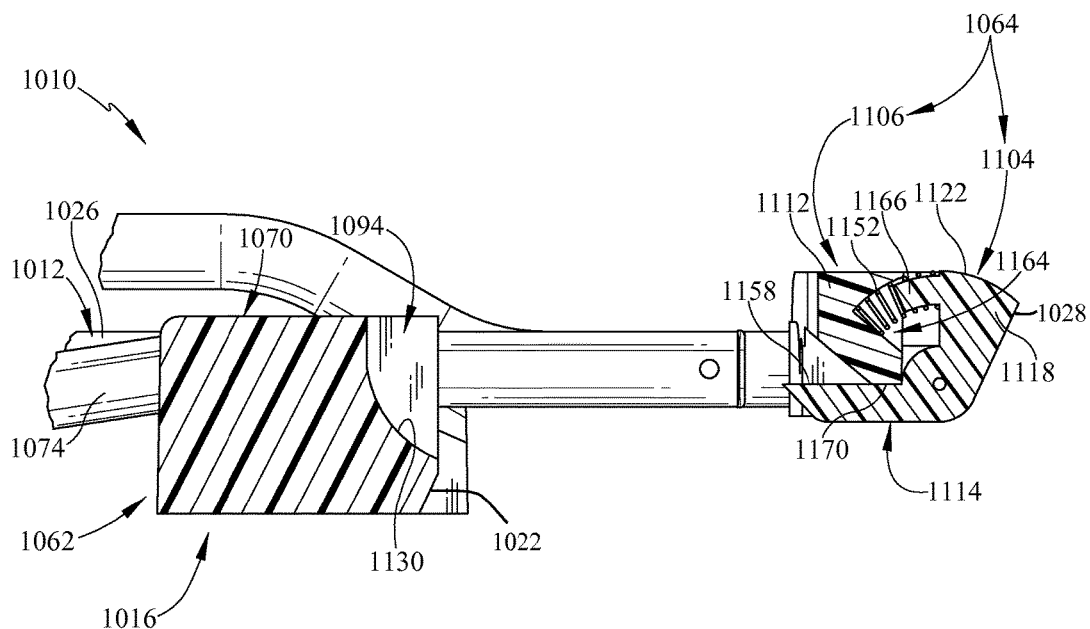
FIG. 23 is a sectional view of the base-pusher lock similar to FIG. 22 showing that the base pusher has been fully rotated to the storage position to cause the hand truck to be converted into the flat storage mode.

Base-pusher rotation blocker 1104 is configured to pivot about blocker pivot axis 1104A between the closed position and the opened position. In the closed position, base-pusher rotation blocker 1104 is configured to block base pusher 1014 from rotating about base-pusher pivot axis 1014A from the upright hand-truck position toward the storage position. In the opened position, base pusher 1014 is freed to pivot about base-pusher pivot axis 1014A from the upright hand-truck position toward the storage position at the option of the user as shown in FIGS. 22-23.

Figure 21:
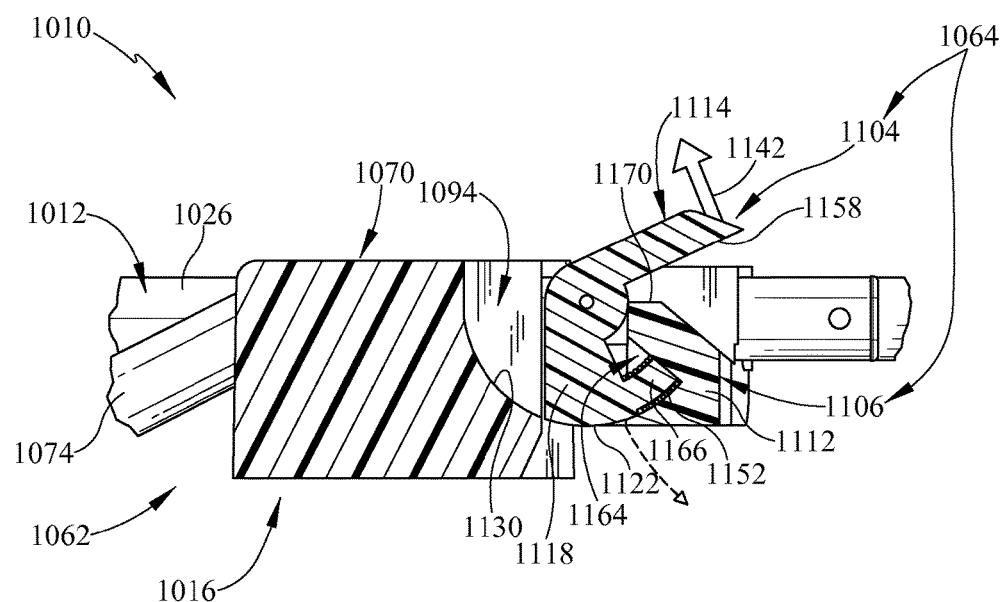
FIG. 21 is sectional view of the base-pusher lock after the base-pusher lock has been pulled upwardly by a user to move the base-pusher lock from the LOCKED CONFIGURATION to the UNLOCKED CONFIGURATION to free the base pusher for movement from the upright hand-truck position toward the storage position to collapse the hand truck into the compact storage mode.

Base-pusher rotation blocker 1104 includes lever handle 1114, release guide 1166, and catch 1118 as shown in FIGS. 19 and 20. Lever handle 1114 is configured to be lifted by a user to pivot base-pusher rotation blocker 1104 about blocker pivot axis 1104A to move base-pusher rotation blocker 1104 to the opened position as shown in FIGS. 20 and 21. In one example, lever handle 1114 is formed to include finger-receiver grooves. Release guide 1166 is configured to support spring 1152 and is received by anchor body 1112 to limit movement of base-pusher rotation blocker 1104. Catch 1118 includes blocker ramp 1028 and catch surface 1122 arranged to engage engagement face 1130 of slidable spreader driver 1070 when base pusher 1014 is in the upright hand-truck position and base-pusher rotation blocker 1104 is in the closed position to block movement of base pusher 1014 as shown in FIG. 20 and to disengage slidable spreader driver 1070 when base-pusher rotation blocker 1104 is in the opened position as shown in FIG. 21. Blocker ramp 1028 is configured to engage ramp surface 1022 included in slidable spreader driver 1070 to open base-pusher rotation blocker 1104 when moving hand truck 1010 to the expanded use mode.

Lever handle 1114 includes downwardly facing lift surface 1158 as shown in FIG. 21. Lift surface 1158 is arranged to be gripped by a user and lifted upwardly to cause base-pusher rotation blocker 1104 to pivot about blocker pivot axis 1104A to move base-pusher lock 1064 from the LOCKED CONFIGURATION, shown in FIG. 20, to the UNLOCKED CONFIGURATION shown in FIG. 21.

To move hand truck 1010 from the expanded use mode to the flat-storage mode, the user pulls upwardly on lift surface 1158 of lever handle 1114 to cause base-pusher rotation blocker 1104 to rotate about blocker pivot axis 1104A and move base-pusher lock 1064 to the UNLOCKED POSITION as suggested by arrow 1142 in FIG. 20. In response to the user lifting lever handle 1114, catch 1118 is moved into spaced apart relation with slidable spreader driver 1070 to free base pusher 1014 to pivot about base-pusher pivot axis 1014A and to free slidable spreader driver 1070 to move along load-support frame 1018. With base pusher 1014 freed, the user then pivots base pusher 1014 about base-pusher pivot axis 1014A from the upright hand-truck position to the storage position in a first direction as suggested in FIGS. 22-23. As base pusher 1014 moves from the upright hand-truck position to the storage position, spreader plate 1072 allows wheel-bias springs 1046, 1056 to move wheels 1023, 1025 from the unfolded rolling positions to the folded storage positions to cause hand truck 1010 to achieve the flat storage mode shown in FIG. 18.

To move hand truck 1010 from the flat-storage mode to the expanded use mode, the user pivots base pusher 1014 about base-pusher pivot axis 1014A from the storage position toward the upright hand-truck position. As base pusher 1014 rotates, blocker ramp 1028 of base-pusher rotation blocker 1104 engages ramp surface 1022 of slidable spreader driver 1070 to cause base-pusher rotation blocker 1104 to overcome the bias force of spring 1152 and rotate about blocker pivot axis 1104A from the closed position to the opened position. When base pusher 1014 is rotated to the upright hand-truck position, base-pusher rotation blocker 1104 is biased to return to the closed position to cause base-pusher lock 1064 to move to the LOCKED CONFIGURATION. In the LOCKED CONFIGURATION, base-pusher rotation blocker 1104 engages slidable spreader driver 1070 to hold base pusher 1014 in position relative to rolling base 1012.

The invention claimed is:

1. A collapsible hand truck comprising
   a rolling base including a load-support frame and a toe-plate shelf coupled to the load-support frame,
   a base pusher mounted for movement relative to the load-support frame of the rolling base about a base-pusher pivot axis from an upright hand-truck position arranged to lie in generally coplanar relation to a top of the load-support frame of the rolling base to establish an expanded use mode to a storage position arranged to lie along the load-support frame of the rolling base to establish a flat storage mode of the hand truck, and
   hand-truck mode changer means for freeing the base pusher for rotation about the base-pusher pivot axis from the upright hand-truck position to the storage position in response to a user lifting a base-pusher rotation blocker with one hand and for allowing the base pusher to return to the upright hand-truck position from the storage position without further interaction with the base-pusher rotation blocker by the user so that the base pusher is freely movable to the upright hand-truck position from the storage position,
   wherein hand-truck mode changer means includes a pusher latch coupled to the base pusher for rotation with the base pusher about the base-pusher pivot axis as the base pusher is moved between the storage position and the upright hand-truck position and the base-pusher rotation blocker is coupled to the rolling base to pivot relative to the rolling base from a closed position arranged to block movement of the pusher latch relative to the rolling base to an opened position arranged to allow the pusher latch to move relative to the rolling base.

2. The hand truck of claim 1, wherein the base-pusher rotation blocker includes a lever handle sized to be gripped by a user to pivot the base-pusher rotation blocker and a stopper coupled to the lever handle for movement with the lever handle, the stopper is arranged to engage the rolling base to limit movement of the base-pusher rotation blocker from moving beyond the closed position, and the stopper is arranged to engage the rolling base to limit movement of the base-pusher rotation blocker from moving beyond the opened position.

3. The hand truck of claim 2, wherein the lever handle and the stopper cooperate to provide a monolithic component.

4. The hand truck of claim 1, wherein the base-pusher rotation blocker includes a catch arranged about midway between a left leg of the base pusher and a right leg of the base pusher to engage the pusher latch and block movement of the base pusher when the base pusher is in the upright hand-truck position.

5. The hand truck of claim 1, wherein the pusher latch includes a left receiver coupled to the left leg of the base pusher, a right leg receiver coupled to the right leg of the base pusher, and an anchor body extending therebetween that is engaged by the catch of the base-pusher rotation blocker when the base pusher is in the upright hand-truck position.

6. The hand truck of claim 5, wherein the anchor body is formed to include a blocker ramp arranged to engage the base-pusher rotation blocker and pivot the base-pusher rotation blocker from the closed position to the opened position when the base pusher is rotated about the base-pusher pivot axis from the flat storage position to the expanded use position.

7. A collapsible hand truck comprising
   a rolling base including a load-support frame and a toe-plate shelf coupled to the load-support frame,
   a base pusher mounted for movement relative to the load-support frame of the rolling base about a base-pusher pivot axis from an upright hand-truck position arranged to lie in generally coplanar relation to a top of the load-support frame of the rolling base to establish an expanded use mode to a storage position arranged to lie along the load-support frame of the rolling base to establish a flat storage mode of the hand truck, and hand-truck mode changer means for freeing the base pusher for rotation about the base-pusher pivot axis from the upright hand-truck position to the storage position in response to a user lifting a base-pusher rotation blocker with one hand and for allowing the base pusher to return to the upright hand-truck position from the storage position without further interaction with the base-pusher rotation blocker by the user so that the base pusher is freely movable to the upright hand-truck position from the storage position, wherein hand-truck mode changer means includes a rotation blocker coupled to the base pusher to pivot relative to the base pusher from a closed position arranged to block movement of the base pusher relative to the rolling base to an opened position arranged to allow the base pusher to move relative to the rolling base.

8. The hand truck of claim 7, wherein the base pusher is configured to pivot about the base-pusher pivot axis relative to the rotation blocker during movement from the upright hand-truck position to the storage position.

9. The hand truck of claim 7, wherein the rolling base includes a left wheel unit mounted for pivotable movement on the load-support frame about a left pivot axis from an unfolded rolling position to a folded storage position and a right wheel unit mounted for pivotable movement on the load-support frame about a right pivot axis from an unfolded rolling position to a folded storage position, the unfolded rolling position of the left and the right wheel units is associated with the expanded use mode of the hand truck in which wheels in the wheel units are arranged to engage and roll on ground underlying the rolling base and rotate about a common axis of rotation, and the folded storage position of the left and the right wheel units is associated with the flat storage mode of the hand truck in which wheels in the wheel units disengage ground underlying the rolling base and the wheel in the left wheel unit is arranged to extend toward the wheel in the right wheel unit.

10. The hand truck of claim 9, wherein hand-truck mode changer means includes a wheel-spreader system configured to cause the wheels in the left and right wheel units to pivot from the unfolded rolling position to the folded storage position in response to movement of the base pusher from the upright hand-truck position to the storage position, the wheel-spreader system includes a slidable spreader driver coupled to the rolling base to slide along the rolling base, a lower linkage interconnecting the rolling base and the slidable spreader driver, and an upper linkage interconnecting the base pusher and the slidable spreader driver, and the upper linkage is configured to rotate and move the slidable spreader driver upward away from the wheel units relative to the load-support frame to cause the lower linkage to pivot the wheels from the unfolded rolling positions to the folded storage positions when the base pusher is rotated about the base-pusher pivot axis from the upright hand-truck position to the storage position.

11. The hand truck of claim 10, wherein the rotation blocker is configured to engage the slidable spreader driver when in the closed position to block movement of the base pusher relative to the rolling base and to disengage the slidable spreader driver when in the opened position to allow the base pusher to move relative to the rolling base.

12. A collapsible hand truck comprising
a rolling base including a load-support frame, a left wheel unit mounted on the load-support frame, and a right wheel unit mounted on the load-support frame,
a base pusher mounted for movement relative to the load-support frame of the rolling base about a base-pusher pivot axis from an upright hand-truck position arranged to lie in generally coplanar relation to a top of the load-support frame of the rolling base to establish the expanded use mode to a storage position arranged to lie along the load-support frame of the rolling base to establish the flat storage mode of the hand truck, and
a base-pusher lock movable from a locked configuration in which the base pusher is held in the upright hand-truck position relative to the load-support frame to maintain the hand truck in the expanded use mode and an unlocked configuration in which the base pusher is free to move from the upright hand-truck position to the storage position, the base-pusher lock including a base-pusher rotation blocker mounted to pivot from a closed position arranged to block movement of the base pusher relative to the rolling base to an opened position arranged to allow the base pusher to move relative to the rolling base and a spring configured to bias the base-pusher rotation blocker toward the closed position, wherein the base-pusher rotation blocker is arranged to engage a ramp surface formed by another component of the collapsible hand truck to cause the base-pusher rotation blocker to pivot from the closed position to the opened position in response to movement of the base pusher from the storage position to the upright hand-truck position and is arranged to disengage the ramp surface upon arrival of the base pusher to the upright hand-truck position so that the base-pusher rotation blocker is free to be moved to the closed position by the spring such that the base pusher is held in place automatically upon arrival of the base pusher to the upright hand-truck position.

13. The hand truck of claim 12, wherein the base-pusher lock includes a pusher latch coupled to the base pusher for rotation with the base pusher about the base-pusher pivot axis as the base pusher is moved between the storage position and the upright hand-truck position and the base-pusher rotation blocker is coupled to the rolling base to pivot relative to the rolling base from the closed position to the opened position.

14. The hand truck of claim 13, wherein the base-pusher rotation blocker includes a lever handle sized to be gripped by one hand of a user and a catch arranged to engage the pusher latch when the base pusher is in the upright hand-truck position and the base-pusher rotation blocker is in a closed position.

15. The hand truck of claim 13, wherein the catch includes an upper face arranged to engage the pusher latch when the hand truck is in the expanded use mode to block rotation of the base pusher about the base-pusher pivot axis and a catch ramp arranged to be contacted by the pusher latch to cause the base-pusher rotation blocker to pivot about the blocker pivot axis from the closed position to the opened position when the base pusher is rotated about the base-pusher pivot axis to the upright hand-truck position from the storage position.

16. The hand truck of claim 13, wherein the pusher latch includes a left receiver coupled to a left leg of the base pusher, a right leg receiver coupled to a right leg of the base pusher, and an anchor body extending therebetween.

17. The hand truck of claim 12, wherein the left wheel unit is mounted for pivotable movement on the load-support frame about a left pivot axis from an unfolded rolling position to a folded storage position and the right wheel unit is mounted for pivotable movement on the load-support frame about a right pivot axis from an unfolded rolling position to a folded storage position, the unfolded rolling position of the left and the right wheel units is associated with the expanded use mode of the hand truck in which wheels in the wheel units are arranged to engage and roll on ground underlying the rolling base and rotate about a common axis of rotation, and the folded storage position of the left and the right wheel units is associated with the flat storage mode of the hand truck in which wheels in the wheel units disengage ground underlying the rolling base and the wheel in the left wheel unit is arranged to extend toward the wheel in the right wheel unit.

18. The hand truck of claim 17, further comprising a wheel-spreader system configured to cause the wheels in the left and right wheel units to pivot from the unfolded rolling position to the folded storage position in response to movement of the base pusher from the upright hand-truck position to the storage position, the wheel-spreader system includes a slidable spreader driver coupled to the rolling base to slide along the rolling base, a lower linkage interconnecting the rolling base and the slidable spreader driver, and an upper linkage interconnecting the base pusher and the slidable spreader driver, and the upper linkage is configured to rotate and move the slidable spreader driver upward away from the wheel units relative to the load-support frame to cause the lower linkage to pivot the wheels from the unfolded rolling positions to the folded storage positions when the base pusher is rotated about the base-pusher pivot axis from the upright hand-truck position to the storage position.

19. The hand truck of claim 18, wherein the rotation blocker is configured to engage the slidable spreader driver when in the closed position to block movement of the base pusher relative to the rolling base and to disengage the slidable spreader driver when in the opened position to allow the base pusher to move relative to the rolling base.

20. The hand truck of claim 18, wherein the base-pusher rotation blocker includes a lever handle sized to be gripped by one hand of a user, a stopper arranged to engage the wheel-spreader system to limit movement of the base-pusher rotation blocker past the closed position, and a catch arranged to engage the pusher latch when the base pusher is in the upright hand-truck position and the base-pusher rotation blocker is in a closed position.

21. The hand truck of claim 12, wherein the base-pusher rotation blocker is coupled to the base pusher for rotation therewith relative to the rolling base between the storage position and the upright hand-truck position and the base-pusher rotation blocker is coupled to the base pusher to pivot relative to the base pusher between the closed position and the opened position.

22. The hand truck of claim 21, wherein the rolling base includes a left wheel unit mounted for pivotable movement on the load-support frame about a left pivot axis from an unfolded rolling position to a folded storage position and a right wheel unit mounted for pivotable movement on the load-support frame about a right pivot axis from an unfolded rolling position to a folded storage position, the unfolded rolling position of the left and the right wheel units is associated with the expanded use mode of the hand truck in which wheels in the wheel units are arranged to engage and roll on ground underlying the rolling base and rotate about a common axis of rotation, and the folded storage position of the left and the right wheel units is associated with the flat storage mode of the hand truck in which wheels in the wheel units disengage ground underlying the rolling base and the wheel in the left wheel unit is arranged to extend toward the wheel in the right wheel unit.

23. The hand truck of claim 22, wherein hand-truck mode changer means includes a wheel-spreader system configured to cause the wheels in the left and right wheel units to pivot from the unfolded rolling position to the folded storage position in response to movement of the base pusher from the upright hand-truck position to the storage position, the wheel-spreader system includes a slidable spreader driver coupled to the rolling base to slide along the rolling base, a lower linkage interconnecting the rolling base and the slidable spreader driver, and an upper linkage interconnecting the base pusher and the slidable spreader driver, and the upper linkage is configured to rotate and move the slidable spreader driver upward away from the wheel units relative to the load-support frame to cause the lower linkage to pivot the wheels from the unfolded rolling positions to the folded storage positions when the base pusher is rotated about the base-pusher pivot axis from the upright hand-truck position to the storage position.

24. The hand truck of claim 23, wherein the rotation blocker is configured to engage the slidable spreader driver when in the closed position to block movement of the base pusher relative to the rolling base and to disengage the slidable spreader driver when in the opened position to allow the base pusher to move relative to the rolling base.

25. A collapsible hand truck comprising
   a rolling base including a load-support frame and a toe-plate shelf coupled to the load-support frame,
   a base pusher mounted for movement relative to the load-support frame of the rolling base about a base-pusher pivot axis from an upright hand-truck position arranged to lie in generally coplanar relation to a top of the load-support frame of the rolling base to establish an expanded use mode to a storage position arranged to lie along the load-support frame of the rolling base to establish a flat storage mode of the hand truck, and
   a base-pusher lock movable from a locked configuration in which the base pusher is held in the upright hand-truck position relative to the load-support frame to maintain the hand truck in the expanded use mode and an unlocked configuration in which the base pusher is free to move from the upright hand-truck position to the storage position, the base-pusher lock including a latch coupled to the base pusher for rotation therewith about the base-pusher pivot axis, a base-pusher rotation configured to selectively engage the latch to block movement of the base pusher only when the base pusher is in the upright hand-truck position, and a bias member,
   wherein the latch is located to be engaged by the base-pusher rotation blocker when the base pusher is in the upright hand-truck position and is spaced apart from the base-pusher rotation blocker and the rolling base when the base pusher is in the storage position such that engagement by the base-pusher rotation blocker is avoided, the base-pusher rotation blocker is mounted to the rolling base to pivot relative to the rolling base from a closed position arranged to block movement of the base pusher relative to the rolling base while the base pusher is in the upright hand-truck position to an opened position arranged to allow the base pusher to move relative to the rolling base while the base pusher is in the upright hand-truck position, and the bias member is configured to bias the base-pusher rotation blocker toward the closed position.

26. The hand truck of claim 25, wherein the rotation blocker is arranged to engage a ramp surface formed by another component of the collapsible hand truck to cause the rotation blocker to pivot from the closed position to the opened position in response to movement of the base pusher from the storage position to the upright hand-truck position and is arranged to disengage the ramp surface upon arrival of the base pusher to the upright hand-truck position so that the base-pusher rotation blocker is free to be moved to the closed position by the bias member such that the base pusher is held in place automatically upon arrival of the base pusher to the upright hand-truck position.

27. The hand truck of claim 25, wherein the rolling base includes a left wheel unit mounted for pivotable movement on the load-support frame about a left pivot axis from an unfolded rolling position to a folded storage position and a right wheel unit mounted for pivotable movement on the load-support frame about a right pivot axis from an unfolded rolling position to a folded storage position, the unfolded rolling position of the left and the right wheel units is associated with the expanded use mode of the hand truck in which wheels in the wheel units are arranged to engage and roll on ground underlying the rolling base and rotate about a common axis of rotation, and the folded storage position of the left and the right wheel units is associated with the flat storage mode of the hand truck in which wheels in the wheel units disengage ground underlying the rolling base and the wheel in the left wheel unit is arranged to extend toward the wheel in the right wheel unit.

28. The hand truck of claim 27, wherein hand-truck mode changer means includes a wheel-spreader system configured to cause the wheels in the left and right wheel units to pivot from the unfolded rolling position to the folded storage position in response to movement of the base pusher from the upright hand-truck position to the storage position, the wheel-spreader system includes a slidable spreader driver coupled to the rolling base to slide along the rolling base, a lower linkage interconnecting the rolling base and the slidable spreader driver, and an upper linkage interconnecting the base pusher and the slidable spreader driver, and the upper linkage is configured to rotate and move the slidable spreader driver upward away from the wheel units relative to the load-support frame to cause the lower linkage to pivot the wheels from the unfolded rolling positions to the folded storage positions when the base pusher is rotated about the base-pusher pivot axis from the upright hand-truck position to the storage position, and wherein the rotation blocker is configured to engage the slidable spreader driver when in the closed position to block movement of the base pusher relative to the rolling base and to disengage the slidable spreader driver when in the opened position to allow the base pusher to move relative to the rolling base.

* * * * *